(12) United States Patent
Takase et al.

(10) Patent No.: US 7,662,503 B2
(45) Date of Patent: Feb. 16, 2010

(54) FUEL CELL, DISASSEMBLY METHOD THEREOF, AND SEPARATORS USED THEREIN

(75) Inventors: Hironari Takase, Toyota (JP); Takahide Tsugane, Toyota (JP); Yoshiaki Kikuchi, Toyota (JP); Hiroshi Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 776 days.

(21) Appl. No.: 10/577,987

(22) PCT Filed: Oct. 15, 2004

(86) PCT No.: PCT/JP2004/015675

§ 371 (c)(1),
(2), (4) Date: May 3, 2006

(87) PCT Pub. No.: WO2005/045969

PCT Pub. Date: May 19, 2005

(65) Prior Publication Data

US 2007/0134536 A1    Jun. 14, 2007

(30) Foreign Application Priority Data

Nov. 10, 2003 (JP) ............................. 2003-380159
Feb. 5, 2004 (JP) ............................. 2004-029770

(51) Int. Cl.
*H01M 2/00* (2006.01)
*H01M 2/08* (2006.01)
*H01M 2/14* (2006.01)

(52) U.S. Cl. .............................. 429/35; 429/34; 429/38
(58) Field of Classification Search .................. 429/35, 429/38, 26
See application file for complete search history.

(56) References Cited

U.S. PATENT DOCUMENTS 5,789,095 A    8/1998    Miyagawa et al.
2002/0081475 A1    6/2002    Simpkins et al.

FOREIGN PATENT DOCUMENTS

CN    1347575 A    5/2002

(Continued)

OTHER PUBLICATIONS

C. Handley et al., "Impact of the European Union vehicle waste directive on end-of-life options for polymer electrolyte fuel cells." Journal of Power Sources, 2002. vol. 106, pp. 344-352.

*Primary Examiner*—Patrick Ryan
*Assistant Examiner*—Thomas H. Parsons
(74) *Attorney, Agent, or Firm*—Oliff & Berridge, PLC

(57) ABSTRACT

A disassembly procedure of a fuel cell places a sloped edge of a cracking tool on a bottom of a recess. The bottom of the recess as a point of application, an opening edge of the recess where a flat side of the cracking tool is placed, is a point of support, and force is applied at a base end of the cracking tool. Leverage is applied to the point of application by an external force creating a crack starts in a separator. The crack goes from the point of application toward a position outside electrodes of an MEA (membrane electrode assembly) but inside sealing members. The procedure then removes the broken separator to expose the MEA outside and cuts off an electrolyte membrane along a cut line CL outside the electrodes but inside the sealing members.

85 Claims, 27 Drawing Sheets

FOREIGN PATENT DOCUMENTS

| | | |
|---|---|---|
| CN | 1 352 813 A | 6/2002 |
| EP | 1 195 831 A1 | 4/2002 |
| EP | 1 217 676 A2 | 6/2002 |
| JP | A 08-171922 | 7/1996 |
| JP | A 08-329959 | 12/1996 |
| JP | A 09-050819 | 2/1997 |
| JP | A 10-321247 | 12/1998 |
| JP | A 11-016594 | 1/1999 |
| JP | A 11-288732 | 10/1999 |
| JP | A 2000-090956 | 3/2000 |
| JP | A 2000-164228 | 6/2000 |
| JP | A 2002-025581 | 1/2002 |
| JP | A 2002-151112 | 5/2002 |
| JP | A 2002-270200 | 9/2002 |
| JP | A 2002-358973 | 12/2002 |
| WO | WO 00/63992 A1 | 10/2000 |
| WO | WO 00/74165 A1 | 12/2000 |

FIG. 3
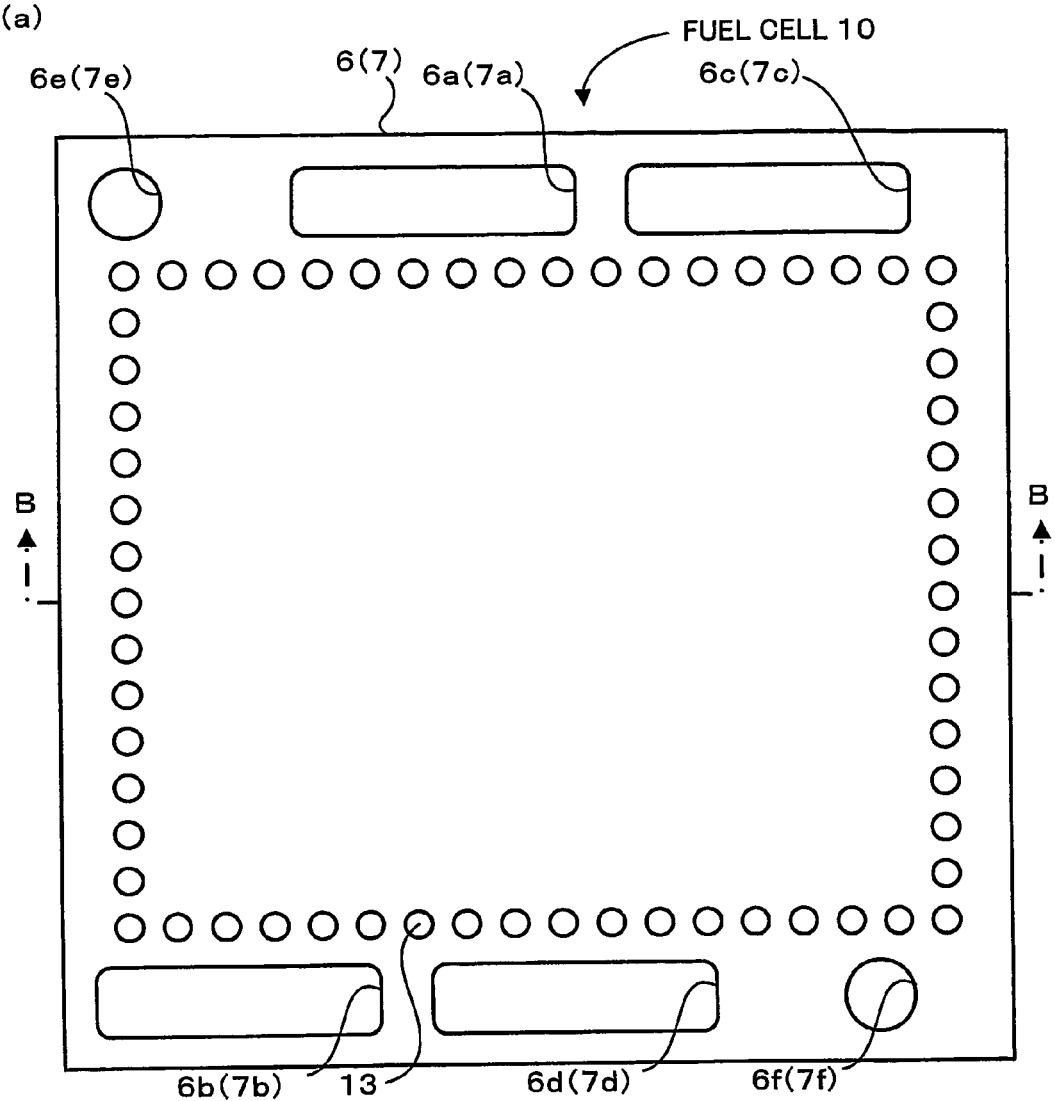
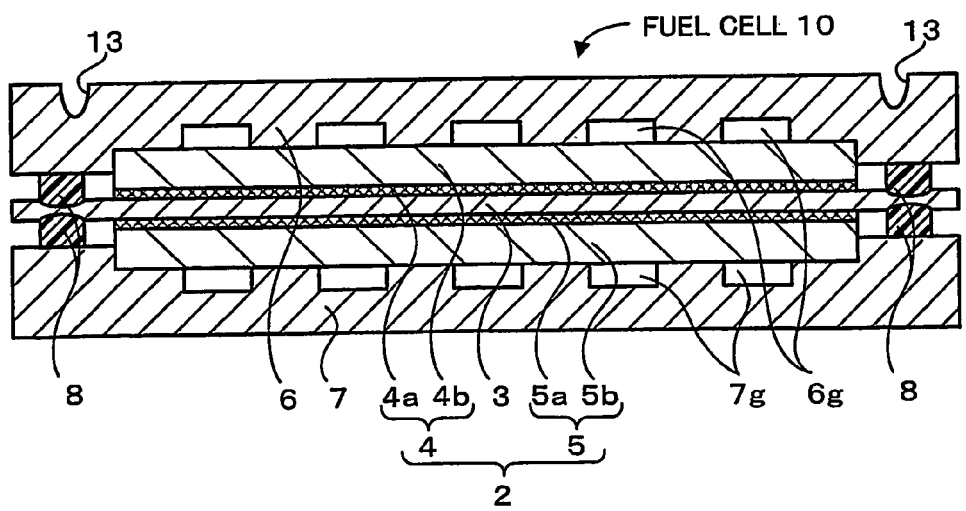

FIG. 8
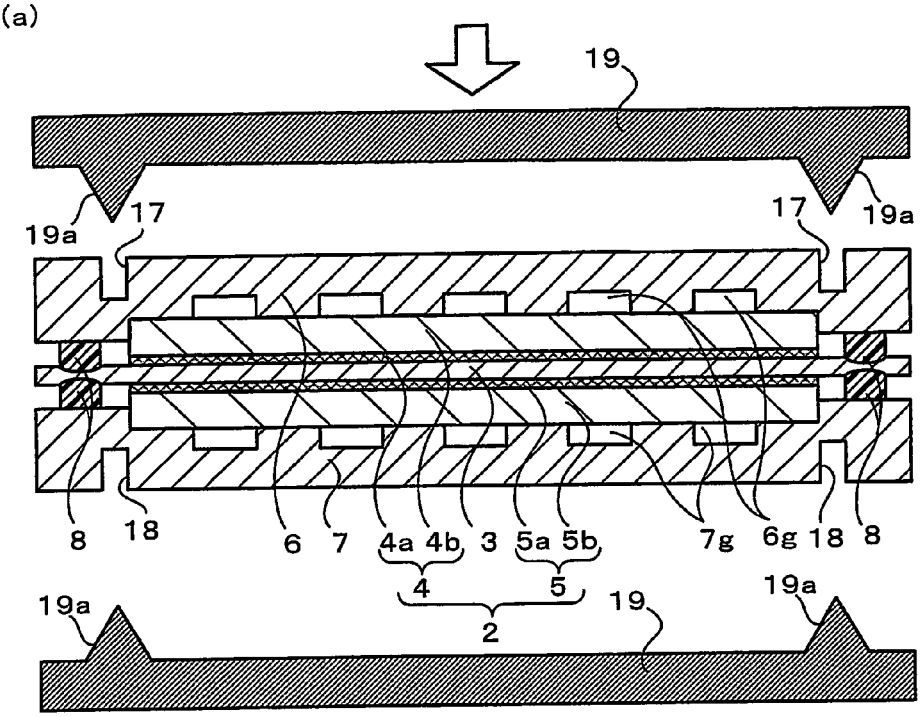
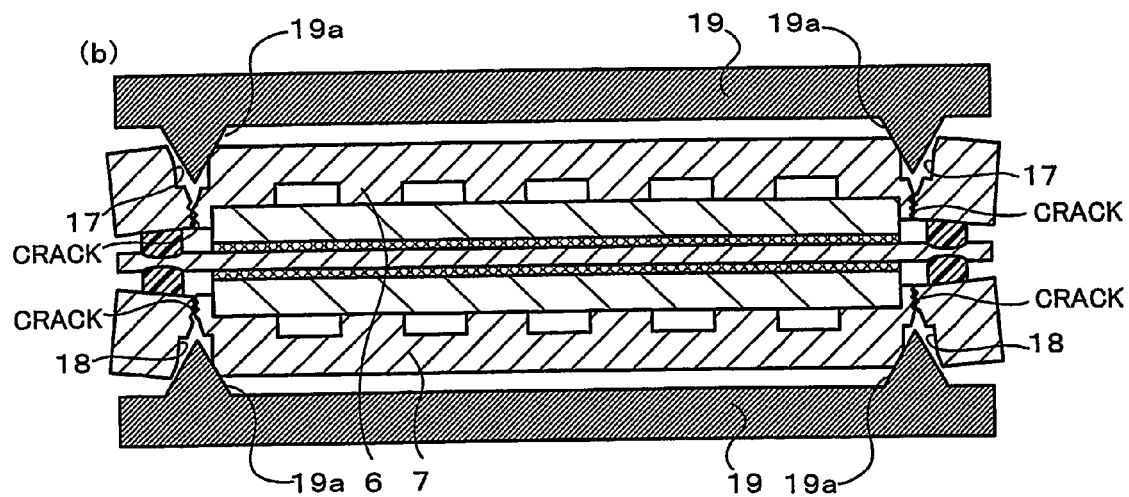

FIG. 15
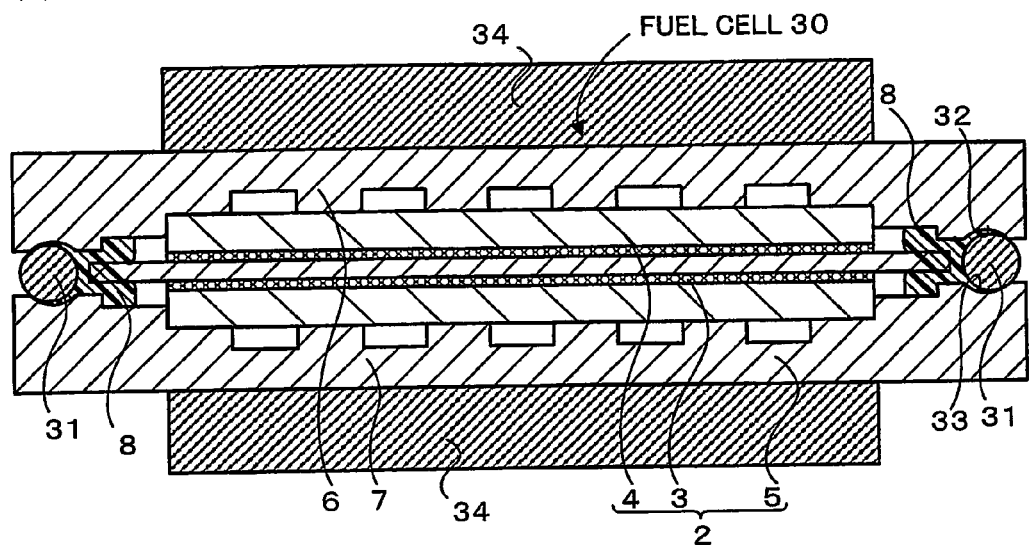
(a)
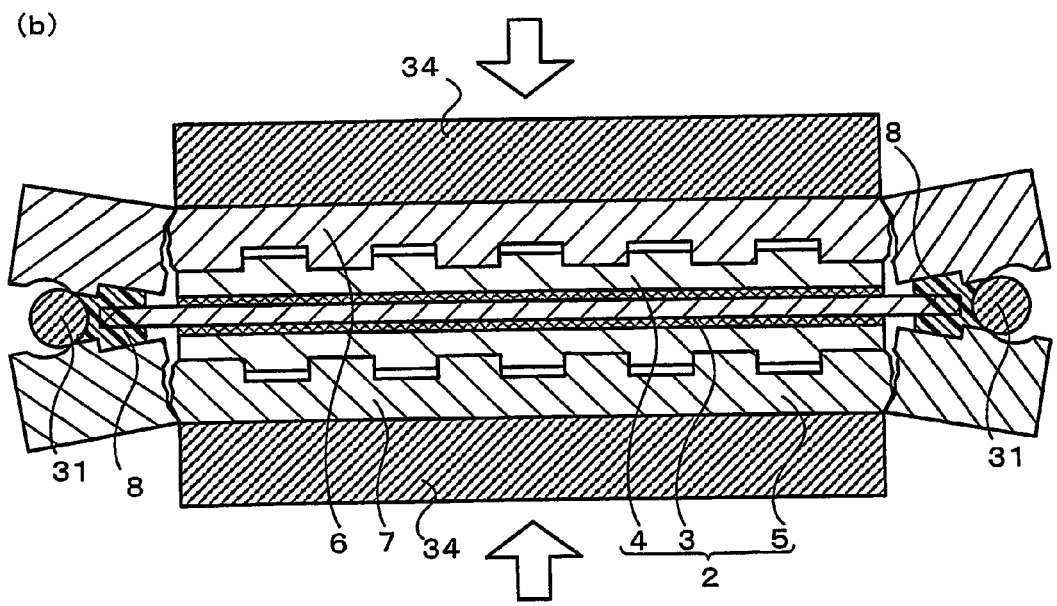
(b)

FIG. 16
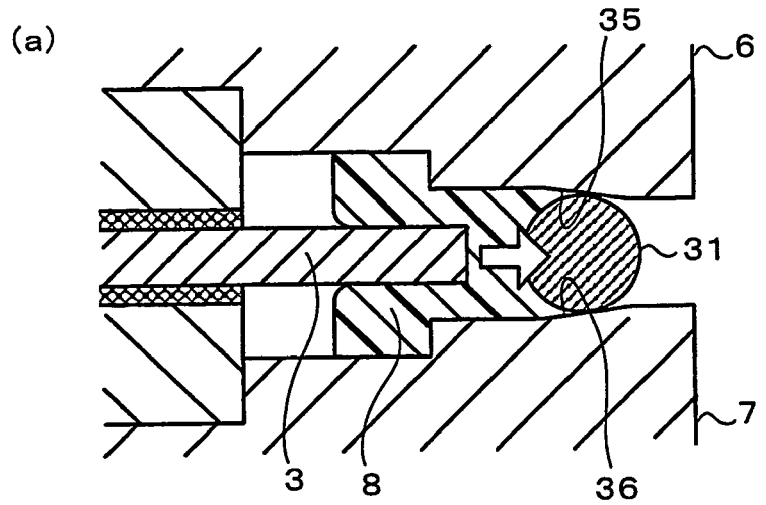
(a)
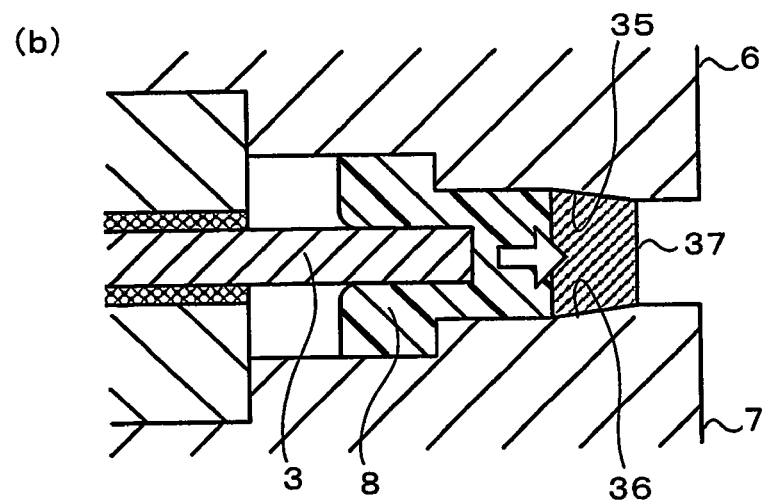
(b)
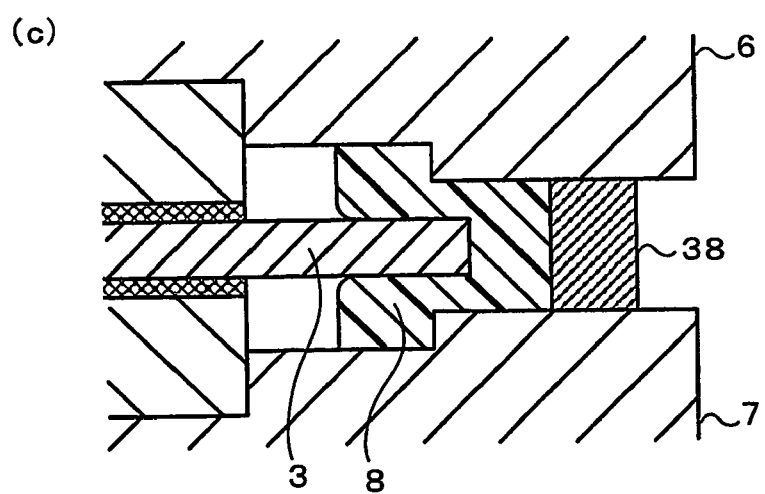
(c)

FUEL CELL, DISASSEMBLY METHOD THEREOF, AND SEPARATORS USED THEREIN

FIELD OF THE INVENTION

The present invention relates to a fuel cell, a disassembly method of the fuel cell, and separators used in the fuel cell.

BACKGROUND ART

A fuel cell of a known structure includes: an electrode assembly that has an electrolyte interposed between a pair of electrodes; a pair of separators that are arranged across the electrode assembly, where one of the separators facing one of the electrodes has an oxidizing gas conduit, while the other of the separators facing the other of the electrodes has a fuel gas conduit; and a sealing member that is formed along periphery of the electrode assembly in a gap between the pair of separators. In the fuel cell of this known structure, a supply of hydrogen is fed as a fuel gas to the fuel gas conduit, whereas a supply of the air is fed as an oxidizing gas to the oxidizing gas conduit. Hydrogen is separated into proton and electron at one of the electrodes (anode) facing the fuel gas conduit. The proton passes through the electrolyte and shifts to the other electrode (cathode), while the electron runs through an external circuit and shifts to the cathode. Oxygen included in the air reacts with the proton and the electron to produce water at the cathode. This electrochemical reaction generates an electromotive force. The sealing member is an adhesive layer for bonding the two separators to each other and functions to prevent direct contact of oxygen with hydrogen on the peripheries of the respective electrodes.

Disassembly of the fuel cell is often required for recovery and recycle of the expensive electrode assembly (especially the electrodes containing noble metal catalysts) from the used fuel cell, for separated collection or disposal of the used fuel cell, and for evaluation of the performance of the electrode assembly in the used fuel cell. For example, a fuel cell disclosed in Japanese Patent Laid-Open Gazette No. 2002-151112 has a linear member placed between a sealing member and a separator. The linear member is pulled out to peel off the sealing member for disassembly of the fuel cell.

In the structure of this prior art fuel cell, however, when the linear-member is tightly stuck to the sealing member, the pulling action of the linear member outward may not move the linear member sufficiently or may destroy the linear member. The sealing member may thus not be peeled off successfully. This structure accordingly does not ensure effective and efficient disassembly of the fuel cell. This structure also requires the linear member between the sealing member and the separator and thus undesirably increases the total number of required elements.

DISCLOSURE OF THE INVENTION

The object of the present invention is to facilitate disassembly of a fuel cell without requiring any additional member. The object of the present invention is also to provide a disassembly method that attains adequate disassembly of the fuel cell according to requirements. The object of the present invention is further to provide a separator suitable for the fuel cell.

In order to attain at least part of the above and the other related objects, the present invention is directed to a fuel cell that generates electric power through reaction of a fuel gas with an oxidizing gas. The fuel cell includes: an electrode assembly that has an electrolyte interposed between a pair of electrodes; a pair of separators that are arranged across the electrode assembly, where one of the separators facing one of the electrodes has an oxidizing gas conduit, while the other of the separators facing the other of the electrodes has a fuel gas conduit; a sealing member that is formed along periphery of the electrode assembly in a gap between the pair of separators; and a breaking guide that is used for breakage of at least one of the separators.

When disassembly of the fuel cell is demanded, the structure of the fuel cell of the invention utilizes the breaking guide to break at least one of the separators. This arrangement ensures effective disassembly of the fuel cell according to the requirements. The technique of the invention is applicable to any types of fuel cells including polymer electrolyte fuel cells, solid oxide fuel cells, molten carbonate fuel cells, phosphoric acid fuel cells, and alkaline fuel cells. One preferable example of the electrolyte is a solid electrolyte.

In the fuel cell of the invention, it is preferable that the breaking guide is used to break at least one of the separators at a position outside the electrodes but inside the sealing member. This arrangement enables the separator to be broken at the position outside the electrodes but inside the sealing member, while hardly damaging the electrodes of the electrode assembly, in the process of disassembling the fuel cell. The breaking guide may be formed at or in a neighborhood of a position of the sealing member on at least one of the separators. Also, the breaking guide may be formed in a thin-wall section formed on at least one of the separators.

In one preferable structure of the fuel cell of the invention, the breaking guide is provided on at least one of the separators and is formed on a specific plane of the separator other than a plane facing the electrode assembly, for example, a plane of the separator adjoining to the plane facing the electrode assembly, such as a side plane, a vertical plane, or an inclined plane. This arrangement ensures easy access to the breaking guide. In another preferable structure, the breaking guide is provided on at least one of the separators and is formed on a specific plane of the separator opposite to a plane facing the electrode assembly. The plane of the separator opposite to the plane facing the electrode assembly has a wider area to facilitate formation of the breaking guide.

In one preferable embodiment of the fuel cell of the invention, the breaking guide includes a recess continuously formed around periphery of the separator or multiple recesses intermittently arranged around periphery of the separator. This structure does not require any additional member but facilitates disassembly of the fuel cell by simply forming the recess or the multiple recesses in the separator. The recess may be formed at a position of the separator outside the electrodes of the electrode assembly but inside the sealing member. In the structure of forming the multiple recesses intermittently, it is desirable that the multiple recesses are arranged at intervals to give connection of cracks in a direction of the face of the separator for breakage.

In this embodiment of the fuel cell of the invention, when the breaking guide includes the multiple recesses formed intermittently, each of the multiple recesses may have a polygonal opening and at least one vertex angle of less than 90 degrees. A crack tends to start from the vertex having the angle of less than 90 degrees in the opening of the recess and to be extended in the direction of the face of the separator for breakage of the separator. This arrangement ensures easy disassemble of the fuel cell. The recess may have a wedge-like cross section in depth of the separator. A crack tends to be extended in the direction of the depth of the separator for breakage of the separator. The recess may otherwise have any of a quasi-V-shaped cross section, a quasi-U-shaped cross section, and a quasi-circular cross section in depth of the separator. An external force can be easily applied for breakage of the separator by the principle of leverage. The recess may be also used as a coolant conduit for coolant to cool down the fuel cell.

When the breaking guide includes the continuous recess or the multiple recesses arranged intermittently, a cracking tool may be used to apply an external force to the recess for breakage of at least one of the separators. One preferable breakage process places an edge of the cracking tool on a bottom of the recess and applies an external force to the bottom, so as to break at least one of the separators. Another preferable breakage process sets a bottom of the recess where an edge of the cracking tool is placed, as a point of application, an opening edge of the recess where a flat side of the cracking tool is placed, as a point of support, and a base end of the cracking tool where a force is applied, as a point of power, and applies the external force to the point of application by the principle of leverage, so as to break at least one of the separators. Still another preferable breakage process provides the cracking tool having a sloped edge and inserts the sloped edge of the cracking tool into an opening of the recess to apply the external force in an expanding direction to the recess, so as to break at least one of the separators.

In another preferable embodiment of the fuel cell of the invention, the breaking guide is provided on at least one of the separators and is mainly made of a different material having a different physical or chemical property from a physical or chemical property of a material of the separator. The different physical or chemical property of the breaking guide from the physical or chemical property of the separator is utilized for breakage of the separator. The breaking guide may be formed by embedding the different material in the separator or by physically or chemically processing or treating at least one preset area of the separator, which is composed of a homogeneous material, to modify the property of the preset area for formation of the breaking guide.

In the fuel cell of the invention, it is preferable that the breaking guide made of the different material is formed in the separator to make surface of the separator substantially flat and even. This arrangement advantageously ensures a higher strength, compared with the breaking guide of the recess or the multiple recesses.

In one preferable embodiment of the fuel cell of the invention, the breaking guide which is made of the different material includes a recess continuously formed around periphery of the separator or multiple recesses intermittently arranged around periphery of the separator. In the structure of forming the multiple recesses intermittently, it is desirable that the multiple recesses are arranged at intervals to give connection of cracks in a direction of the face of the separator for breakage. In this embodiment of the fuel cell of the invention, when the breaking guide includes the multiple recesses formed intermittently, the breaking guide may have a polygonal exposure area with at least one vertex angle of less than 90 degrees, on surface of the separator. A crack tends to start from the vertex having the angle of less than 90 degrees and to be extended in the direction of the face of the separator for breakage of the separator. This arrangement ensures easy disassemble of the fuel cell. The recess may have a wedge-like cross section in depth of the separator. A crack tends to be extended in the direction of the depth of the separator for breakage of the separator.

In the fuel cell of the invention, when the breaking guide is made of the different material, the different material preferably has a practically equivalent electrical conductivity to an electrical conductivity of the separator. In a fuel cell stack having multiple fuel cells laid one upon another in series, this arrangement ensures a sufficiently large contact area of the adjoining fuel cells and a sufficiently high electrical conductivity.

In the fuel cell of the invention, when the breaking guide is made of the different material, the different material preferably has a different hardness from a hardness of the separator. In one example, the different material has a higher hardness than the hardness of the separator. The breaking guide of the higher hardness is pressed into depth of the separator for breakage of the separator. In another example, the different material has a lower hardness than the hardness of the separator. A cracking tool is pressed into depth of the separator to destroy the breaking guide for breakage of the separator.

In this embodiment of the fuel cell of the invention having the breaking guide made of the different material, the cracking tool may be used to apply an external force to the breaking guide for breakage of at least one of the separators. The different physical or chemical property of the breaking guide from the physical or chemical property of the separator is utilized for breakage of the separator. In one example, when the breaking guide is made of a material having a higher hardness than the hardness of the separator, the procedure uses the cracking tool to apply an external force to the breaking guide and thereby press the breaking guide into depth of the separator for breakage of the separator. In another example, when the breaking guide is made of a material having a lower hardness than the hardness of the separator, the procedure places an edge of a cracking tool on the breaking guide and applies the external force to the breaking guide to press the edge of the cracking tool into depth of the separator and destroy the breaking guide for breakage of the separator.

In still another preferable embodiment of the fuel cell of the invention, the breaking guide includes a blockage member that is formed on or outside the periphery of the electrode assembly in the gap between the pair of separators to prevent the gap from being narrowed less than a preset width under application of a pressing force in a direction of narrowing the gap. The disassembly procedure of the fuel cell applies a pressing force (an external force in the direction of narrowing the gap) at a position on the periphery of the electrode assembly or its nearby position on the separator. The gap between the pair of separators is narrowed at the position of the separator under application of the pressing force, while the blockage member keeps the gap to be not less than the preset width. This arrangement thus leads to breakage of the separator at the position on the periphery of the electrode assembly or its nearby position. The blockage member is desirably made of a material having a higher hardness than the hardness of the separator.

In the fuel cell of the invention, when the breaking guide includes the blockage member, it is preferable that the blockage member is arranged along periphery of the separator not to interfere with smooth supply and discharge of the fuel gas and the oxidizing gas. The blockage member is formed in the gap between the pair of separators, where the fuel gas conduit and the oxidizing gas conduit are located. It is accordingly preferable that the blockage member includes multiple sections arranged intermittently.

In the fuel cell of the invention, when the breaking guide includes the blockage member, it is also preferable that the blockage member is made of a dielectric material. The dielectric material effectively prevents the electrodes arranged across the electrolyte from being electrically connected via the blockage member.

In the fuel cell of the invention, when the breaking guide includes the blockage member, it is further preferable that top and bottom portions of the blockage member come into close contact with the pair of separators to prevent leakage of the sealing member, when the blockage member is pressed toward an end of the separator. The blockage member of this structure effectively prevents leakage of the sealing member, while being used for breakage of the separator.

In the fuel cell of the invention, when the breaking guide includes the blockage member, it is also preferable that the blockage member has a quasi-circular cross section in depth of the separator, and each of the separators has a gradual-varying portion to gradually narrow the gap between the pair of separators toward ends of the separators. This arrangement relatively readily attains the function of preventing leakage of the sealing member. The blockage member may be round bar members or spherical members arranged along periphery of the separator.

In this embodiment of the fuel cell of the invention having the blockage member as the breaking guide, when an external force is applied to an inward area of the separator inside the blockage member in a direction of narrowing the gap, the presence of the blockage member applies a bending force to bend the face of the separator for breakage of at least one of the separators. The external force may be applied on a practically whole inward area of the separator inside the blockage member.

In another preferable embodiment of the fuel cell of the invention, the breaking guide includes an inclined face that is formed on at least one of the separators and is extended from an outer end position of the sealing member or its nearby position toward an end of the separator to gradually widen the gap between the pair of separators. The breaking guide helps insertion of an edge of a cracking-tool into the gap between the pair of separators and accordingly breakage of the separator with the cracking tool. For example, as a sloped edge of the cracking tool is inserted into depth of the gap between the pair of separators, the cracking tool comes into contact with both the separators to apply a force in a direction of expanding the gap between the pair of separators for breakage of the separator.

In the fuel cell of the invention, when the breaking guide includes the inclined face, it is preferable that the inclined face keeps a space when a cracking tool having a sloped edge is inserted into the gap between the pair of separators. This arrangement helps insertion of the sloped edge of the cracking tool into the gap between the pair of separators.

In the fuel cell of the invention, when the breaking guide includes the inclined face, it is also preferable that the inclined face has an angle of inclination that is not less than an angle of gradient of the sloped edge of the cracking tool. This arrangement restrains the cracking tool from coming into contact with the inclined face of the separator. There is accordingly little possibility of breaking the separator on the inclined face. The inclined face is formed on the end of the separator (that is, outside the sealing member). Breakage of the inclined face accordingly does not allow easy access to the electrode assembly. It is thus desirable to prevent breakage of the separator on the inclined face.

In the fuel cell of the invention, when the breaking guide includes the inclined face, it is further preferable that the breaking guide includes the inclined face and a horizontal face that is formed on the other of the separators to guide a horizontal movement of an edge of a cracking tool inserted inward into the gap between the pair of separators. The edge of the cracking tool moves along the horizontal face to be inserted inward the fuel cell. This arrangement effectively prevents the cracking tool from being moved unstably along the vertical axis.

In still another preferable embodiment of the fuel cell of the invention, the breaking guide includes a thin-wall section formed on at least one of the separators. The thin-wall section is readily breakable, compared with the other part of the separator. Application of an external force onto the thin-wall section thus relatively easily breaks the separator. The thin-wall section may be formed by cutting down a plane of the separator facing the electrode assembly. This arrangement does not reduce the contact area of the adjoining separators in contact with each other in a stack of multiple fuel cells.

In the structure of the breaking guide with the inclined face or the breaking guide with the inclined face and the horizontal face, while an external force is applied to an inward area of the separator inside the sealing member in a direction of narrowing the gap between the pair of separators, an edge of a cracking tool is inserted along the breaking guide into depth of the gap. The cracking tool then comes into contact with both the separators to apply a force in a direction of expanding the gap between the pair of separators. This gap-expanding force breaks at least one of the separators. In one example, the procedure may provide two cracking tools and insert the two cracking tools from opposite directions into the gap between the pair of separators. In another example, the procedure may insert the edge of the cracking tool along the breaking guide into the gap between the pair of separators and twist the cracking tool. The cracking tool then comes into contact with both the separators to apply a force in a direction of expanding the gap between the pair of separators. This gap-expanding force breaks at least one of the separators.

The present invention is also directed to a disassembly method of disassembling a fuel cell, which includes an electrode assembly having an electrolyte and electrodes, a pair of separators arranged across the electrode assembly, and a sealing member interposed between the pair of separators. The disassembly method includes the step of applying an external force to an opposite plane of at least one of the separators (that is, an outer face of the separator), which is opposite to a plane of the separator facing the electrode assembly, so as to facilitate disassembly of the fuel cell. The external force may be applied at a position between the electrodes and the sealing member (that is, at a position outside the electrodes but inside the sealing member) or its nearby position on the outer face of the separator. A breaking guide may be formed on the opposite plane of the separator to show the position between the electrodes and the sealing member, although this breaking guide is not essential. Any of a pressure device, a laser irradiation device, a highly-compressed fluid feeding device, a higher-hardness particle feeding device, and a cutter may be utilized for application of the eternal force.

In one preferable application of the disassembly method of the invention, the disassembly-facilitating step inserts a cutting tool from outside of the fuel cell into the gap between the pair of separators, so as to apply the external force. The connection of the separators is cut off by the inserted cutting tool. This facilitates removal of the separator and subsequent collection of the electrode assembly for recovery and recycle. The cutting tool may be used to cut the sealing member or part of the separator. The cutting tool may be a cutting blade like a cutter or a boring tool like a drill. In another preferable application of the disassembly method of the invention, the disassembly-facilitating step clamps the pair of separators to apply a pressure and successively shifts a pressing position to give warpage of the separators in directions away from each other. The warpage of the separators in the directions away from each other facilitates removal of the separator and subsequent collection of the electrode assembly for recovery and recycle. It is desirable that the pair of separators are made of a metal for easy occurrence of warpage. The disassembly-facilitating step may heat the sealing member to soften or melt the sealing member, simultaneously with clamping the pair of separators to apply the pressure, and successively shift a heating and pressing position along a line of the sealing member. This arrangement reduces the adhesive force of the sealing member to facilitate separation of the separators from each other. The disassembly-facilitating step may use a pair of pressure rollers to clamp the pair of separators for application of the pressure and to successively shift the pressing position. The disassembly-facilitating step may alternatively use a pair of rollers with a heater function to heat the sealing member and thereby soften or melt the sealing member, simultaneously with clamping the pair of separators for application of the pressure, and to successively shift a heating and pressing position along a line of the sealing member.

The present invention is further directed to a separator, which is used in a pair to be arranged across, an electrode assembly having an electrolyte interposed between a pair of electrodes. The separator has a breaking guide that is formed along periphery of the separator for breakage of the separator. This structure of the invention allows breakage of the separator to ensure effective disassembly of a fuel cell according to the requirements. One preferable electrolyte is a solid electrolyte.

In the separator of the invention, it is preferable that the breaking guide is used to break the separator at a position outside the electrodes but inside a sealing member, which is arranged along periphery of the electrode assembly. The breaking guide may be formed at or in a neighborhood of a position of a sealing member, which is arranged along periphery of the electrode assembly, or may be formed in a thin-wall section of the separator having a less thickness than a thickness of the other part of the separator, may be formed. The breaking guide may be provided on at least one of the separators and is formed on a specific plane of the separator other than a plane facing the electrode assembly or a plane of the separator opposite to a plane facing the electrode assembly.

In one preferable embodiment of the separator of the invention, the breaking guide includes a recess continuously formed around periphery of the separator or multiple recesses intermittently arranged around periphery of the separator. In this embodiment of the separator of the invention, when the breaking guide includes the multiple recesses formed intermittently, the multiple recesses may have a polygonal opening which has at least one vertex angle of less than 90 degrees. In this embodiment, the recess may have any of a wedge-like cross section, a quasi-V-shaped cross section, a quasi-U-shaped cross section, and a quasi-circular cross section in depth of the separator. The recess may be also used as a coolant conduit used for cooling down a fuel cell in which the separator is included.

In another preferable embodiment of the separator of the invention, the breaking guide is mainly made of a different material having a different physical or chemical property from a physical or chemical property of a material of the separator.

In the separator of the invention having the breaking guide made of the different material, the breaking guide may be formed to make surface of the separator substantially flat and even. The breaking guide may include an element formed continuously along the periphery of the separator or multiple elements formed intermittently along the periphery of the separator. When the breaking guide includes multiple elements formed intermittently along the periphery of the separator, the breaking guide may have a polygonal exposure area with at least one vertex angle of less than 90 degrees, on surface of the separator. The breaking guide may have a wedge-like cross section in depth of the separator. In the separator of the invention having the breaking guide made of the different material, it is preferable that the different material has a different hardness from a hardness of the separator. Here, the hardness of the different material may be higher or lower than the hardness of the separator. The different material may have a practically equivalent electrical conductivity to an electrical conductivity of the separator. In the separator having the breaking guide made of the different material, the different physical or chemical property of the breaking guide is utilized for breakage of the separator.

In another preferable embodiment of the separator of the invention, the breaking guide includes an inclined face that is extended from an outer end position of a sealing member, which is arranged along periphery of the electrode assembly, or its nearby position toward an end of the separator. In this embodiment, the inclined face may make a space for insertion of a cracking tool having a sloped edge from the end of the separator toward the sealing member, which is arranged along the periphery of the electrode assembly. The inclined face may have an angle of inclination that is not less than an angle of gradient of the sloped edge of the cracking tool. The inclined face of the breaking guide in the separator helps insertion of the sloped edge of the cracking tool into the gap between the pair of separators.

In still another preferable embodiment of the separator of the invention, the breaking guide includes a thin-wall section having a less thickness than a thickness of the other part of the separator. In this embodiment, the thin-wall section may be formed by cutting down a plane of the separator facing the electrode assembly. The thin-wall section is easily broken and thus helps the breakage of the separator.

In the fuel cell of the invention, the electrode assembly may be received in an inner space of an outer frame member. The outer frame member may be combined or integrated with one of the separators to form a container, where an opening of the container is closed by the other of the separators as a cover. In assembly of a fuel cell, this structure ensures easy and accurate positioning of the electrode assembly relative to the separator.

BRIEF DESCRIPTION OF THE DRAWINGS

FIG. 3 shows the structure of one modified example of the fuel cell;

FIGS. 8 and 9 respectively show a modified example of the disassembly procedure;

FIG. 15 shows a disassembly procedure of the fuel cell in the third embodiment;

FIG. 16 shows the structures of modified examples of the fuel cell in the third embodiment;

BEST MODES OF CARRYING OUT THE INVENTION

Some optimum modes of carrying out the invention are discussed below as preferred embodiments.

First Embodiment

Figure 1:
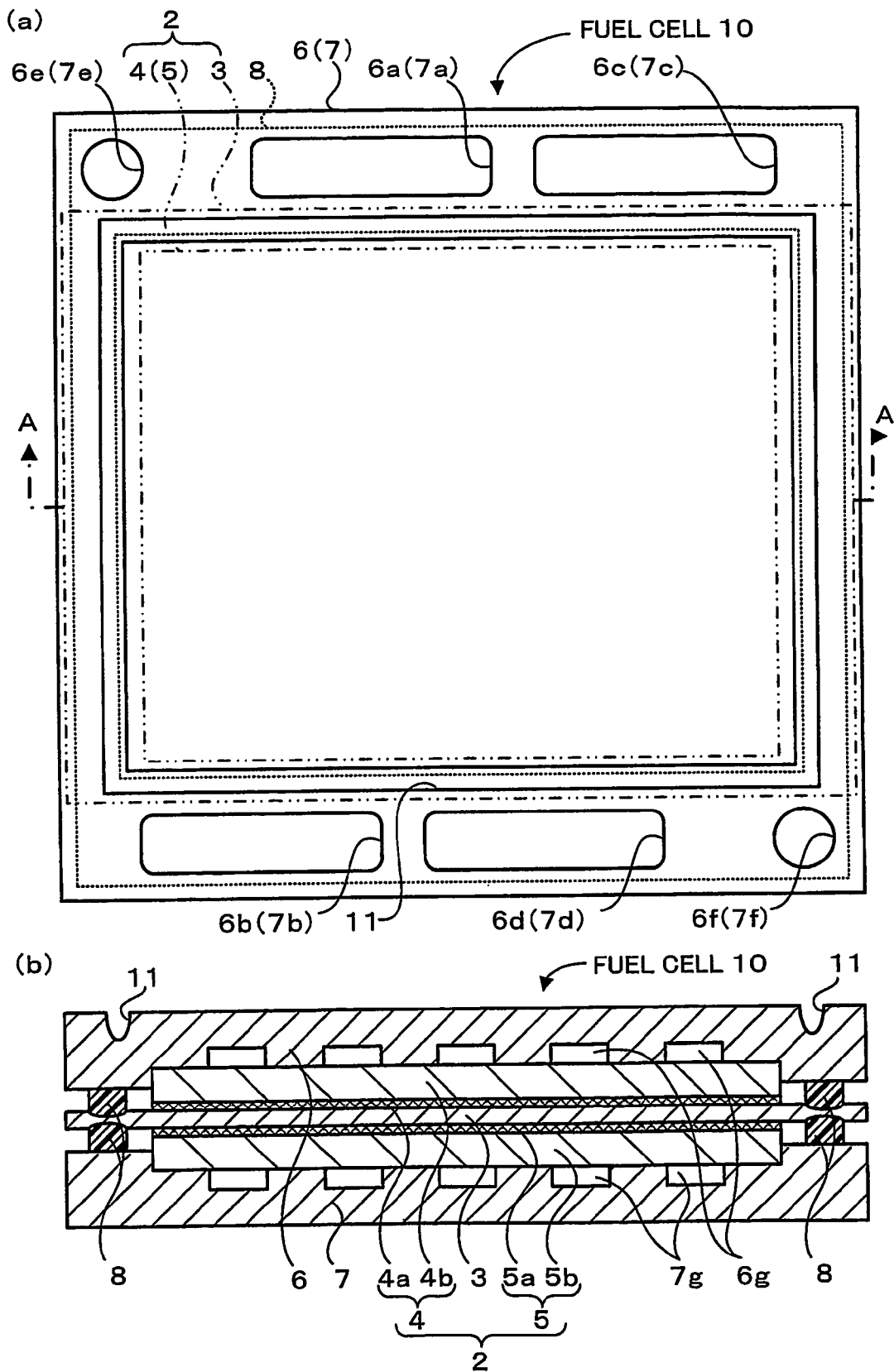
FIG. 1 schematically illustrates the structure of a fuel cell in a first embodiment of the invention.

FIG. 1 schematically illustrates the structure of a fuel cell 10 in a first embodiment of the invention. FIG. 1(*a*) is a plan view, and FIG. 1(*b*) is a sectional view taken on a line A-A in FIG. 1(*a*).

The fuel cell 10 of this embodiment is a polymer electrolyte fuel cell and includes, as main constituents, a membrane electrode assembly (hereafter referred to as MEA) 2 having an electrolyte membrane 3 interposed between a pair of electrodes 4 and 5, a pair of separators 6 and 7 arranged across the MEA 2, sealing members 8 located to surround the outer circumference of the MEA 2, and a recess 11 used as a breaking guide for breakage of one of the separators 6. The fuel cell 10 is a unit cell having an electromotive force in a range of about 0.6 to 0.8 V. A large number of the fuel cells 10 are tightly laid one upon another to form a direct current power source of several hundred volts as a power supply of, for example, a drive motor of the vehicle.

The MEA 2 has the electrolyte membrane 3 located between the fuel electrode or anode 4 and the oxygen electrode or cathode 5. In the structure of the MEA 2 of the embodiment, the area of the electrolyte membrane 3 is greater than the areas of the anode 4 and the cathode 5. The electrolyte membrane 3 is mainly made of a solid polymer material having good proton conductivity in wet state, such as a fluororesin membrane (for example, a Nafion membrane manufactured by DuPont). The anode 4 and the cathode 5 respectively have catalyst electrodes 4*a* and 5*a* and gas diffusion electrodes 4*b* and 5*b*. The catalyst electrodes 4*a* and 5*a* are located to be in contact with the electrolyte membrane 3 and are made of electrically conductive carbon black with fine platinum particles carried thereon. The gas diffusion electrodes 4*b* and 5*b* are laid upon the catalyst electrodes 4*a* and 5*a* and made of carbon cloth of carbon fibers. Platinum contained in the catalyst electrodes 4*a* and 5*a* function to accelerate separation of hydrogen into proton and electron, as well as production of water from oxygen, proton, and electron. Any other catalyst having the same functions may be used in place of platinum. The gas diffusion electrodes 4*b* and 5*b* are not restricted to the carbon cloth but may be made of carbon paper or carbon felt of carbon fibers. The carbon material is demanded to have sufficient gas diffusion property and electrical conductivity.

The separators 6 and 7 are made of a gas-impermeable electrically conductive material, for example, gas-impermeable molded carbon obtained by compressing carbon in this embodiment. The separators 6 and 7 respectively have fuel gas supply inlets 6*a* and 7*a* for supply of a fuel gas, fuel gas discharge outlets 6*b* and 7*b* for discharge of the fuel gas, oxidizing gas supply inlets 6*c* and 7*c* for supply of an oxidizing gas, oxidizing gas discharge outlets 6*d* and 7*d* for discharge of the oxidizing gas, coolant supply inlets 6*e* and 7*e* for supply of a coolant (for example, a cooling fluid), and coolant discharge outlets 6*f* and 7*f* for discharge of the coolant. One of the separators 6 has a fuel gas conduit 6*g* on a face in contact with the anode 4 of the MEA 2 to allow passage of the fuel gas, and a coolant conduit (not shown) on the opposite face to allow passage of the coolant. The fuel gas conduit 6*g* has multiple channels that are connected to the fuel gas supply inlet 6*a* and the fuel gas discharge outlet 6*b*, while not being connected to the other inlets or outlets. The coolant conduit is, on the other hand, connected to the coolant supply inlet 6*e* and the coolant discharge outlet 6*f*, while not being connected to the other inlets or outlets. The other of the separators 7 has an oxidizing gas conduit 7*g* on a face in contact with the cathode 5 of the MEA 2 to allow passage of the oxidizing gas, and a coolant conduit (not shown) on the opposite face to allow passage of the coolant. The oxidizing gas conduit 7*g* has multiple channels that are connected to the oxidizing gas supply inlet 7*c* and the oxidizing gas discharge outlet 7*d*, while not being connected to the other inlets or outlets. The coolant conduit is, on the other hand, connected to the coolant supply inlet 7*e* and the coolant discharge outlet 7*f*, while not being connected to the other inlets or outlets. The separators 6 and 7 may be made of a metal, instead of carbon.

The sealing members 8 are adhesive layers set over the whole outer circumference of the electrolyte membrane 3 of the MEA 2 without the anode 4 and the cathode 5. The sealing members 8 seal a space for the fuel gas defined by the electrolyte membrane 3 and the separator 6, while sealing a space for the oxidizing gas defined by the electrolyte membrane 3 and the separator 7. The sealing members 8 have through holes formed at positions corresponding to the positions of the respective inlets and outlets 6*a* to 6*f* and 7*a* to 7*f* in the separators 6 and 7. In this embodiment, the sealing members 8 have the sealing functions, in addition to the adhesive functions to bond the pair of separators 6 and 7. The sealing members 8 may, however, have no sealing functions but only the adhesive functions. In this modified structure, the sealing members 8 may be any adhesive layers.

The recess 11 is a continuous groove formed around the periphery of the separator 6 on the other plane opposite to the plane facing the MEA 2. The recess 11 has a quasi-U-shaped cross section in depth of the separator 6. The recess 11 is designed to.

The following describes power generation of the fuel cell 10. For power generation of the fuel cell 10, a supply of humidified hydrogen is fed as the fuel gas to the fuel gas supply inlets 6a and 7a, while a supply of the air is fed as the oxidizing gas to the oxidizing gas supply inlets 6c and 7c. The flow of hydrogen goes from the fuel gas supply inlet 6a through the fuel gas conduit 6g to the fuel gas discharge outlet 6b to be discharge outside. The flow of the air goes from the oxidizing gas supply inlet 7c through the oxidizing gas conduit 7g to the oxidizing gas discharge outlet 7d to be discharge outside. The flow of hydrogen passes through the fuel gas conduit 6g, is diffused by the gas diffusion electrode 4b of the anode 4 to reach the catalyst electrode 4a, and is separated into proton and electron by the function of the catalyst electrode 4a. The protons are transmitted through the electrolyte membrane 3 in the wet state and are shifted to the cathode 5. The electrons pass through a non-illustrated external pathway to be shifted to the cathode 5. The flow of the air passes through the oxidizing gas conduit 7g, and is diffused by the gas diffusion electrode 5b to reach the catalyst electrode 5a. The proton, the electron, and oxygen in the air react to produce water and generate an electromotive force at the cathode 5. A supply of the coolant is externally fed into the coolant supply inlets 6e and 7e to keep the temperature of the fuel cell 10 in an adequate temperature range for power generation (for example, 70 to 80° C.). The flow of the coolant goes through the non-illustrates coolant conduits formed in the separators 6 and 7, is discharged from the coolant discharge outlets 6f and 7f, is cooled down by a non-illustrated heat exchanger, and is recirculated into the coolant supply inlets 6e and 7e. The electrolyte membrane 3 of the MEA 2 works to conduct the proton, while functioning as an insulation membrane to prevent the air from directly coming into contact with the hydrogen inside the fuel cell 10. The sealing members 8 prevent the air from being mixed with the hydrogen on the periphery of the MEA 2, while preventing the air and the hydrogen from leaking out of the fuel cell 10.

Figure 2:
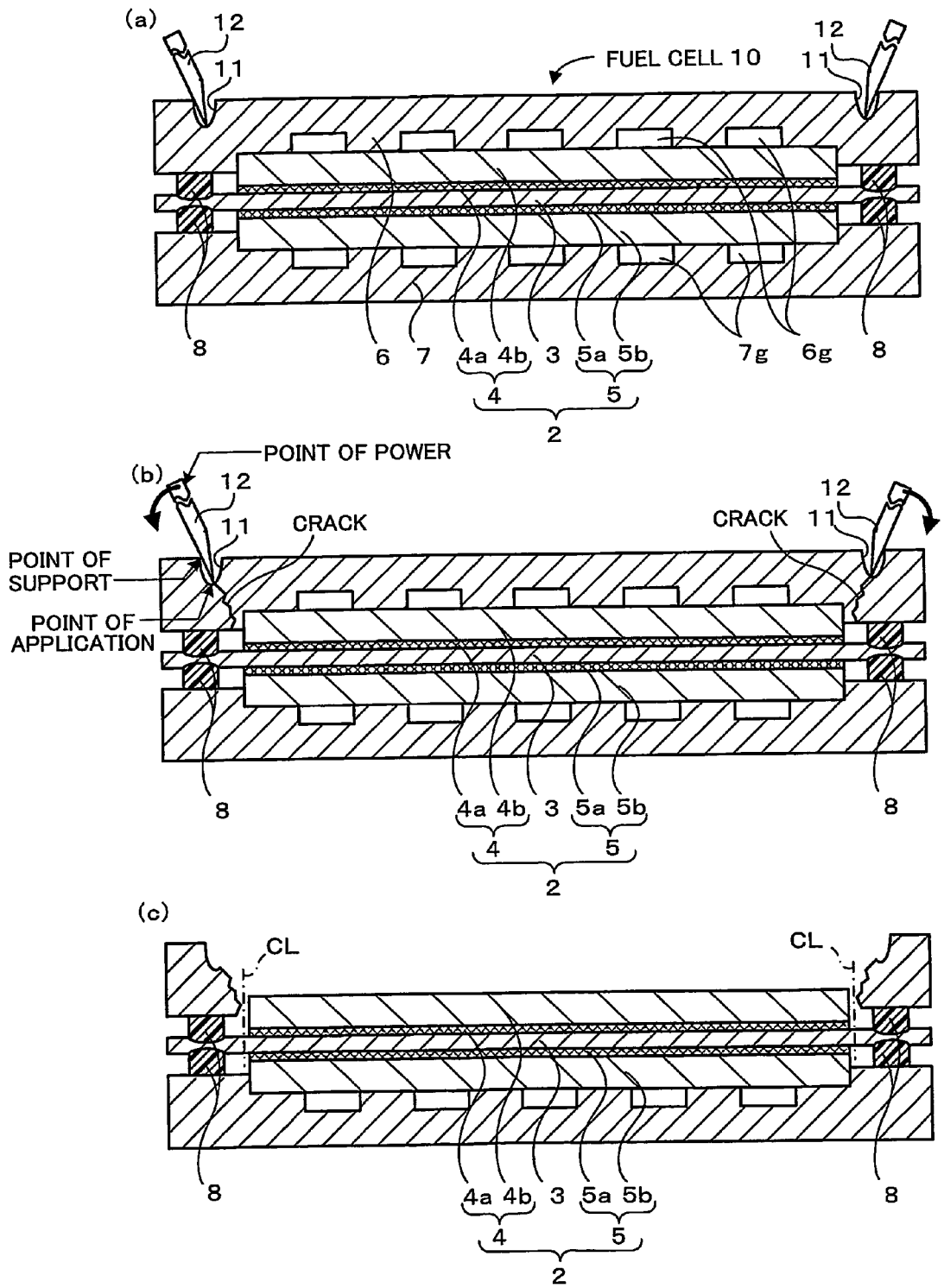
FIG. 2 shows a disassembly procedure of the fuel cell.

A disassembly procedure of disassembling the fuel cell 10 is described below with reference to FIG. 2. FIG. 2 shows the disassembly procedure of the fuel cell 10. The procedure first provides a cracking tool 12 having a sloped edge, such as a flat-blade chisel or carver, and places the edge of the cracking tool 12 on the bottom of the recess 11, as shown in FIG. 2(*a*). The procedure then sets the bottom of the recess 11 where the edge of the cracking tool 12 is placed, as a point of application, an opening edge of the recess 11 where a flat side of the cracking tool 12 is placed, as a point of support, and a base end (a handle) of the cracking tool 12 where a force is applied, as a point of power, and applies an external force to the point of application by the principle of leverage, as shown in FIG. 2(*b*). A crack starts from the point of application in the separator 6. The crack goes from the point of application toward a position outside the electrodes 4 and 5 of the MEA 2 but inside the sealing members 8. This series of operations is repeated over the whole length of the recess 11 to complete the breakage of the separator 6. The procedure then removes the broken separator 6 to expose the MEA 2 outside and cuts off the electrolyte membrane 3 along a cut line CL outside the electrodes 4 and 5 but inside the sealing members 8, as shown in FIG. 2(*c*).

As described above, in the structure of the fuel cell 10 of the first embodiment, when disassembly of the fuel cell 10 is demanded, the recess 11 as the breaking guide is utilized to break the separator 6. This arrangement ensures easy disassembly of the fuel cell 10 when required. The separator 6 is broken at the position outside the electrodes 4 and 5 but inside the sealing members 8. The electrodes 4 and 5 of the MEA 2 are thus recoverable, and recyclable, while being hardly damaged. The recess 11 is formed on the other plane of the separator 6 that is opposite to the plane facing the MEA 2. This arrangement ensures easy access to the recess 11 and facilitates formation of the recess 11 on the wide area of the opposite plane of the separator 6. The breaking guide of the embodiment is the recess 11 formed on the separator 6 by cutting or by another suitable operation. Compared with the structure of the prior art fuel cell, this arrangement ensures easy disassembly of the fuel cell 10 without any additional member. The recess 11 is formed to have a quasi-U-shaped cross section in depth of the separator 6. This shape facilitates application of a sufficient force onto the bottom of the recess 11 with the cracking tool 12 for breakage of the separator 6 according to the principle of leverage.

In the structure of the first embodiment discussed above, the recess 11 is formed only on the separator 6. The recess may otherwise be formed only on the separator 7 or on both the separators 6 and 7.

Figure 4:
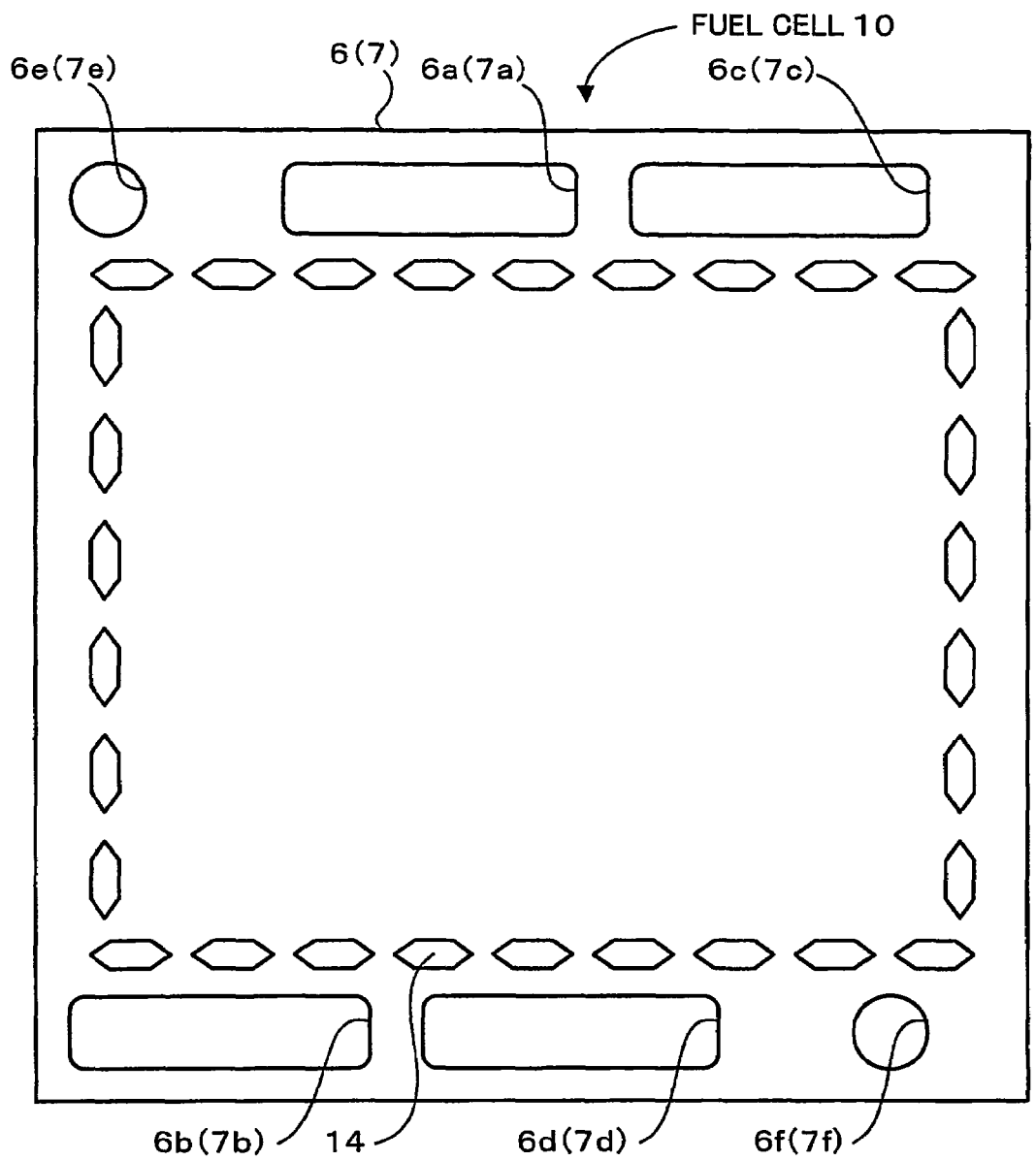
FIG. 4 is a plan view showing the structure of another modified example of the fuel cell.

In the structure of the first embodiment discussed above, the recess 11 is the continuous groove formed around the periphery of the separator 6. The recess may, however, be formed intermittently. FIG. 3 shows the structure of one modified example with recesses 13 arranged intermittently. FIG. 3(*a*) is a plan view, and FIG. 3(*b*) is a sectional view taken on a line B-B of FIG. 3(*a*). As shown in FIG. 3, the recesses 13 are circular holes formed around the periphery of the separator 6. The procedure of disassembly also takes advantage of the principle of leverage and places the edge of the cracking tool 12 on the bottoms of the dotted recesses 13. This structure exerts the substantially similar functions and effects to those of the first embodiment described above. FIG. 4 is a plan view showing the structure of another modified example with recesses 14 arranged intermittently. As shown in FIG. 4, the recesses 14 are polygonal (for example, hexagonal) holes with an angle of two facing vertexes of the polygon set to be less than 90 degrees (for example 40 to 60 degrees). When an external force is applied onto the bottoms of the recesses 14 by the edge of the cracking tool 12, a crack starts from the sharp vertex and is extended in the direction of the face of the separator 6. This structure thus also ensures easy disassembly of the fuel cell 10. The recesses 13 or 14 are arranged at intervals to give connection of the cracks in the direction of the face of the separator 6 for breakage. The recesses 13 or 14 may be arranged in multiple lines according to the requirements.

Figure 5:
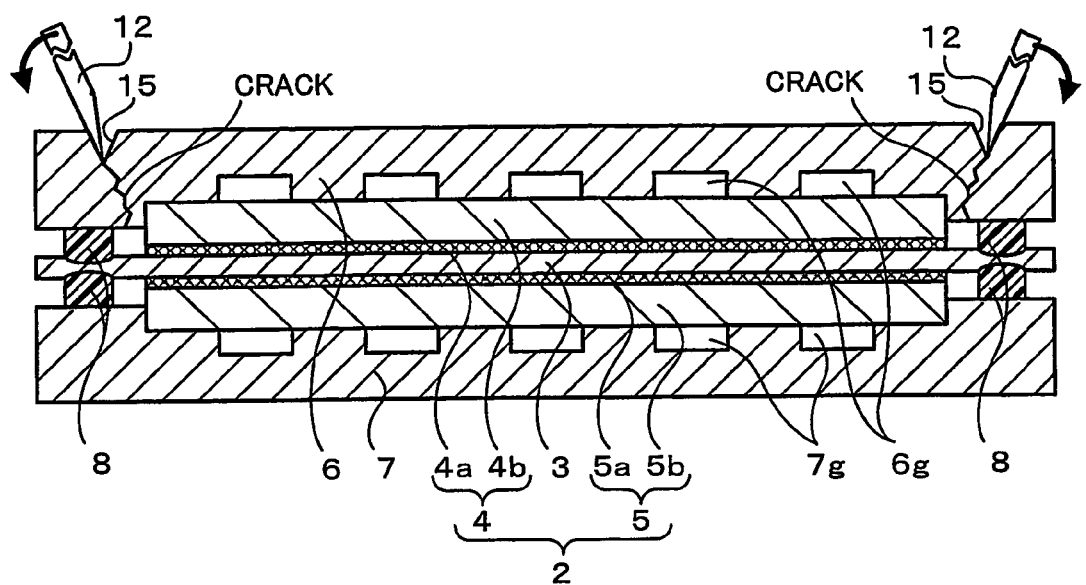
FIG. 5 shows a one modified example of a breaking guide in the fuel cell.

In the structure of the first-embodiment discussed above, the recess 11 is formed to have a quasi-U-shaped cross section in depth of the separator 6. The cross section of the recess is, however, not restricted to the U-shape but may be a quasi-V-shape or a quasi-semicircular shape. The structure of one modified example shown in FIG. 5 has a recess 15 formed to have a quasi-V-shaped (wedge-shaped) cross section. The V-shape attains easy cracking from the lower end of the recess 15 in the direction of depth for breakage of the separator 6. This structure ensures easier disassembly of the fuel cell 10.

The structure of the first embodiment takes advantage of the principle of leverage to make a crack on the bottom of the recess 11. The principle of leverage is, however, not essential. One modified procedure may place the edge of the cracking tool 12 on the bottom of the recess 11 and hit the base end (handle) of the cracking tool 12 with a hammer to make a crack on the bottom of the recess 11.

Figure 6:
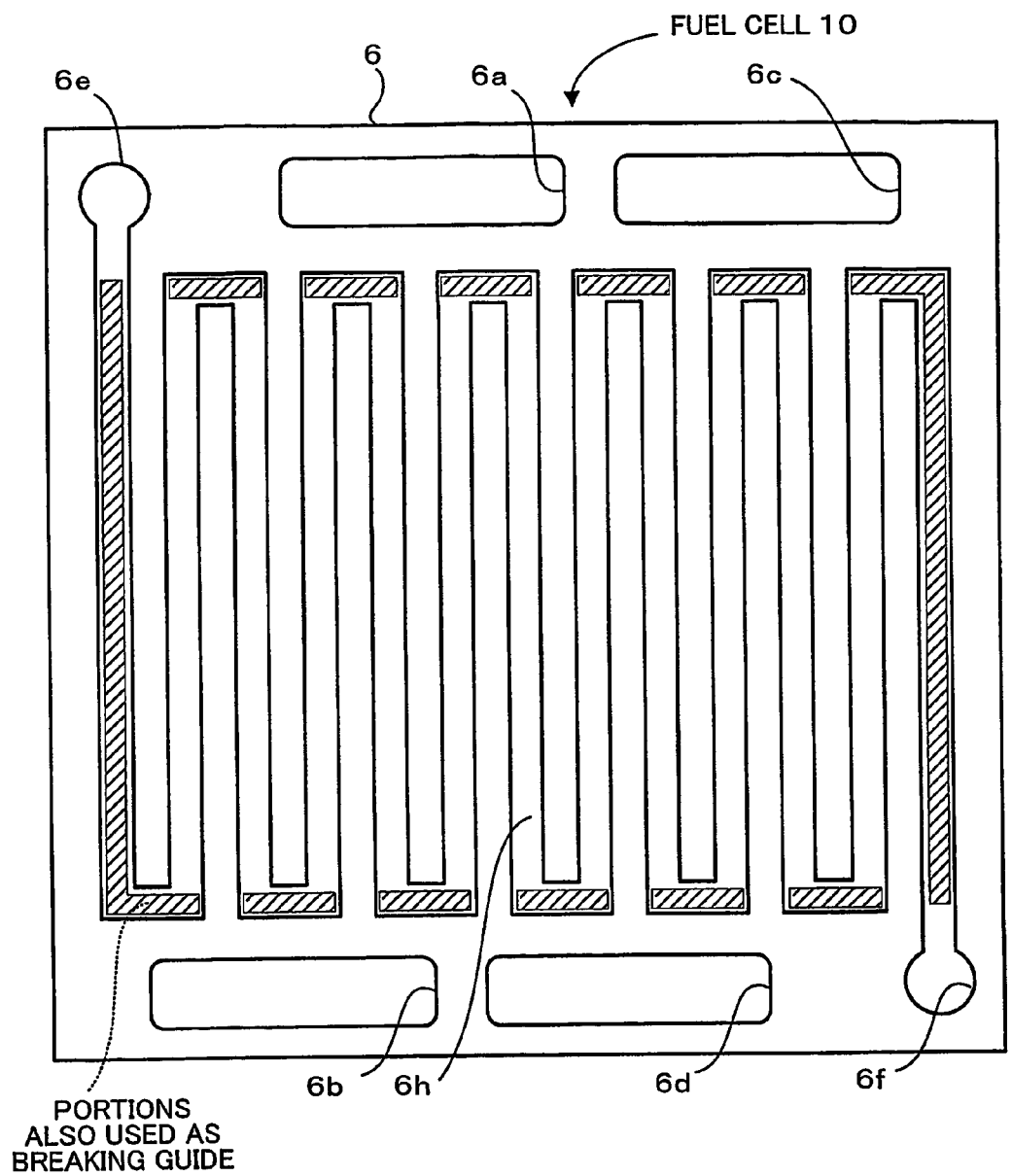
FIG. 6 shows the structure of another modified example of the fuel cell.

In the structure of the first embodiment discussed above, the recess 11 is formed separately from the coolant conduit of the separator 6. In the structure of another modified example shown in FIG. 6, part of a coolant conduit of the separator 6 is also used as the recess or breaking guide. Hatched portions in FIG. 6 represent the part of the coolant conduit also used as the recess. This structure exerts the substantially similar functions and effects to those of the first embodiment described above, while not requiring formation of a separate recess as the breaking guide on the separator 6.

Figure 7:
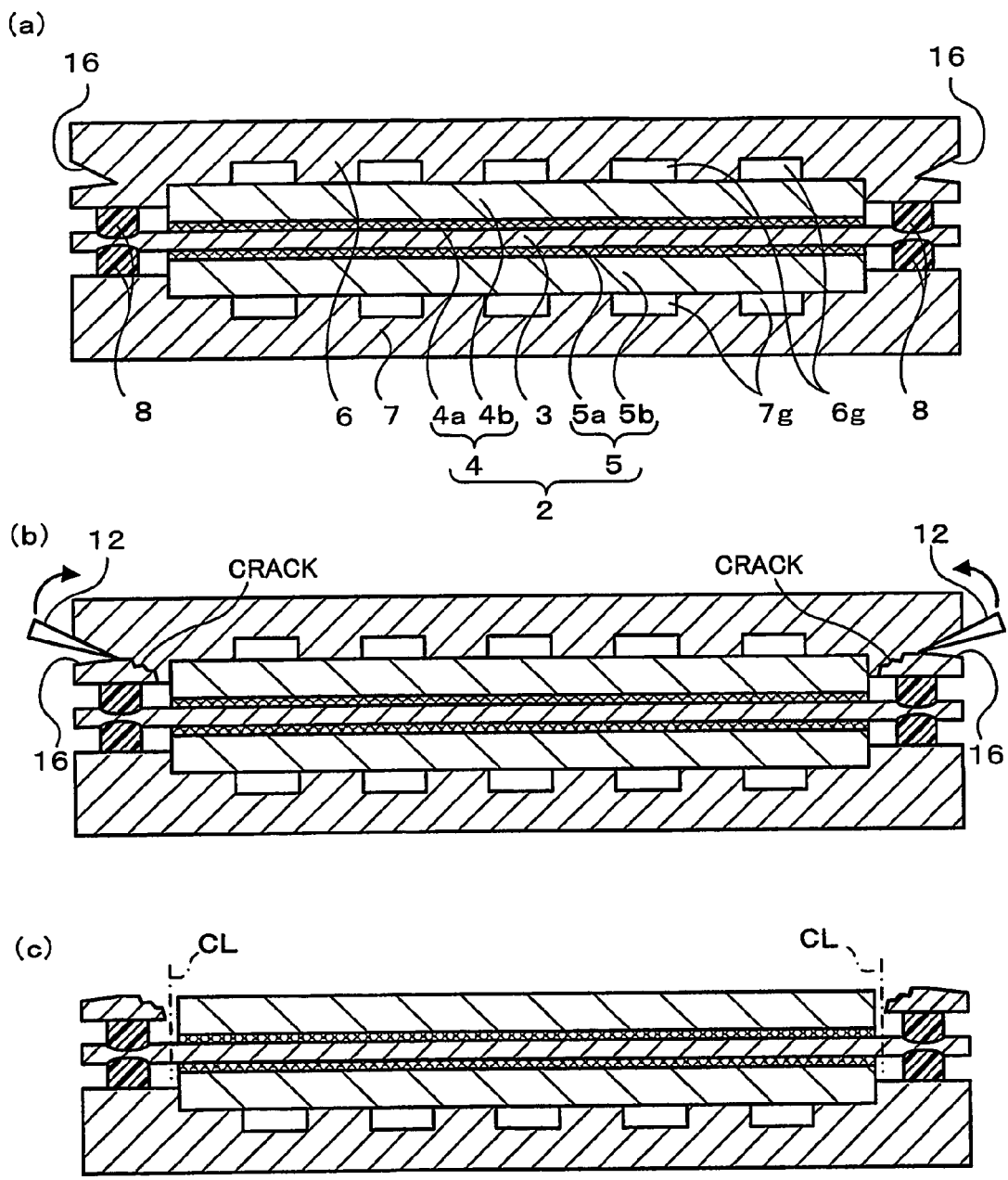
FIG. 7 shows a disassembly procedure of a modified example of the fuel cell.

In the structure of the first embodiment discussed above, the recess 11 is formed on the other plane of the separator 6 opposite to the plane facing the MEA 2. In the structure of another modified example shown in FIG. 7, a recess 16 is formed on a side face of the separator 6 (see FIG. 7(a)). The disassembly procedure sets the bottom of the recess 16 where the edge of the cracking tool 12 is placed, as a point of application, an opening edge of the recess 16 where a flat side of the cracking tool 12 is placed, as a point of support, and a base end (a handle) of the cracking tool 12 where a force is applied, as a point of power, and applies an external force to the point of application by the principle of leverage, as shown in FIG. 7(b). A crack starts from the point of application in the separator 6. The crack goes from the point of application toward a position outside the electrodes 4 and 5 of the MEA 2 but inside the sealing members 8. This series of operations is repeated over the whole length of the recess 16 to complete the breakage of the separator 6. The procedure then removes the broken separator 6 to expose the MEA 2 outside and cuts off the electrolyte membrane 3 along a cut line CL outside the electrodes 4 and 5 but inside the sealing members 8, as shown in FIG. 7(c). In this modified structure, the recess 16 is formed in the narrower side face than the surface of the separator 6. This structure thus gives a little difficulty in formation of the recess but exerts the substantially similar functions and effects to those of the first embodiment discussed above.

Figure 9:
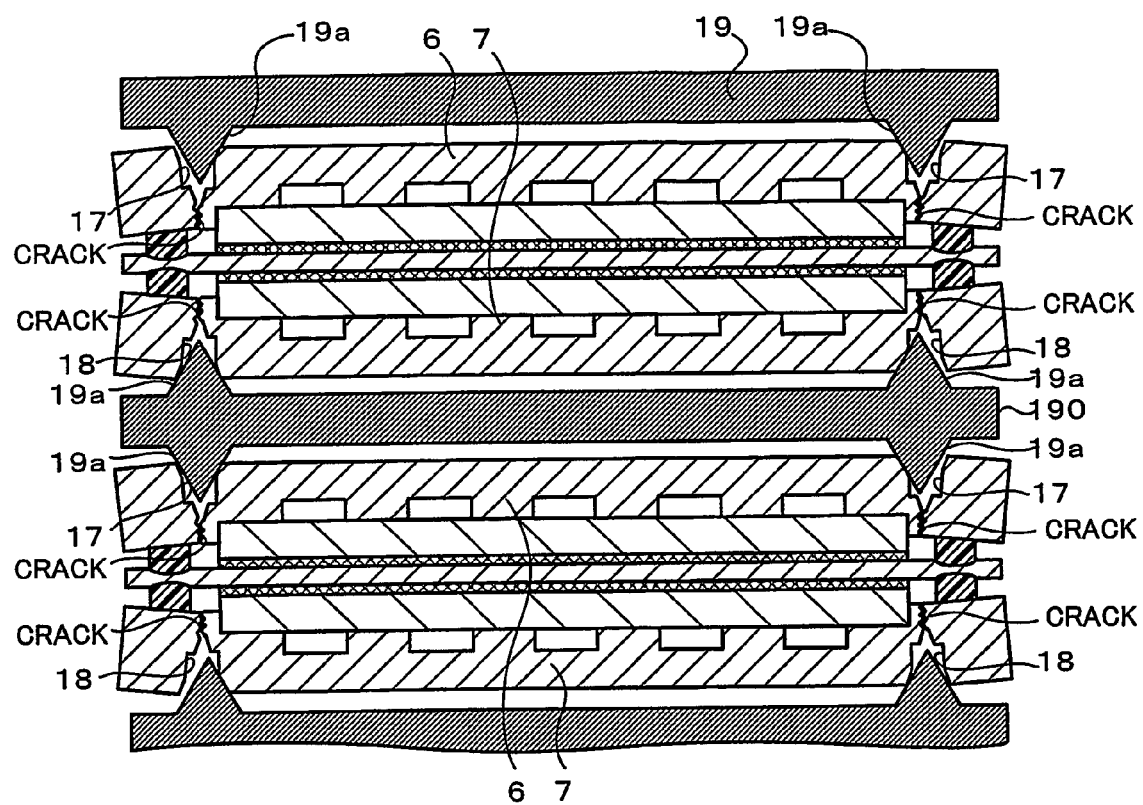

In the structure of the first embodiment discussed above, the disassembly procedure places the edge of the cracking tool 12 on the bottom of the recess 11 and applies an external force onto the bottom of the recess 11 to make a crack on the separator 6 for breakage. Another technique may be adopted for breakage of the separator 6. In the structure of another modified example shown in FIG. 8, the separators 6 and 7 are broken by tearing recesses 17 and 18 formed in the separators 6 and 7. The recesses 17 and 18 are formed on the other planes of the separators 6 and 7 opposite to the planes facing the MEA 2 to have quasi-U-shaped cross sections around the peripheries of the respective separators 6 and 7. The recesses 17 and 18 may be formed continuously or intermittently. The disassembly procedure of the fuel cell first places two cracking tools 19, 19 at positions facing the separators 6 and 7, as shown in FIG. 8(a). A wedge 19a of one cracking tool 19 is positioned to face the recess 17 formed on the separator 6, whereas a wedge 19a of the other cracking tool 19 is positioned to face the recess 18 formed on the separator 7. Each of the wedges 19a is tapered to have a varying diameter from the greater-diameter base to the smaller-diameter free end than the diameter of the recesses 17 and 18. As shown in FIG. 8(b), the cracking tools 19, 19 are pressed against the top face and the bottom face of the fuel cell. The free ends of the wedges 19a are inserted into the openings of the recesses 17 and 18, and the greater-diameter portions of the wedges 19a than the diameter of the recesses 17 and 18 enter the recesses 17 and 18 to apply an external force in an expanding direction to the recesses 17 and 18. The bottoms of the recesses 17 and 18 formed in the separators 6 and 7 are cracked and torn, so that the separators 6 and 7 are broken. The cracks are made at the positions outside the electrodes 4 and 5 but inside the sealing members 8. This structure exerts the substantially similar functions and effects to those of the first embodiment discussed above. The recess may be formed only on either one of the separator 6 and the separator 7 and may have a cross section other than the quasi-U-shaped cross section (for example, a quasi-V-shaped cross section or a quasi-semicircular cross section). A cracking tool 190 having wedges 19a formed on both faces thereof may be located between a pair of adjoining fuel cells to disassemble the multiple fuel cells simultaneously, as shown in FIG. 9.

Second Embodiment

Figure 10:
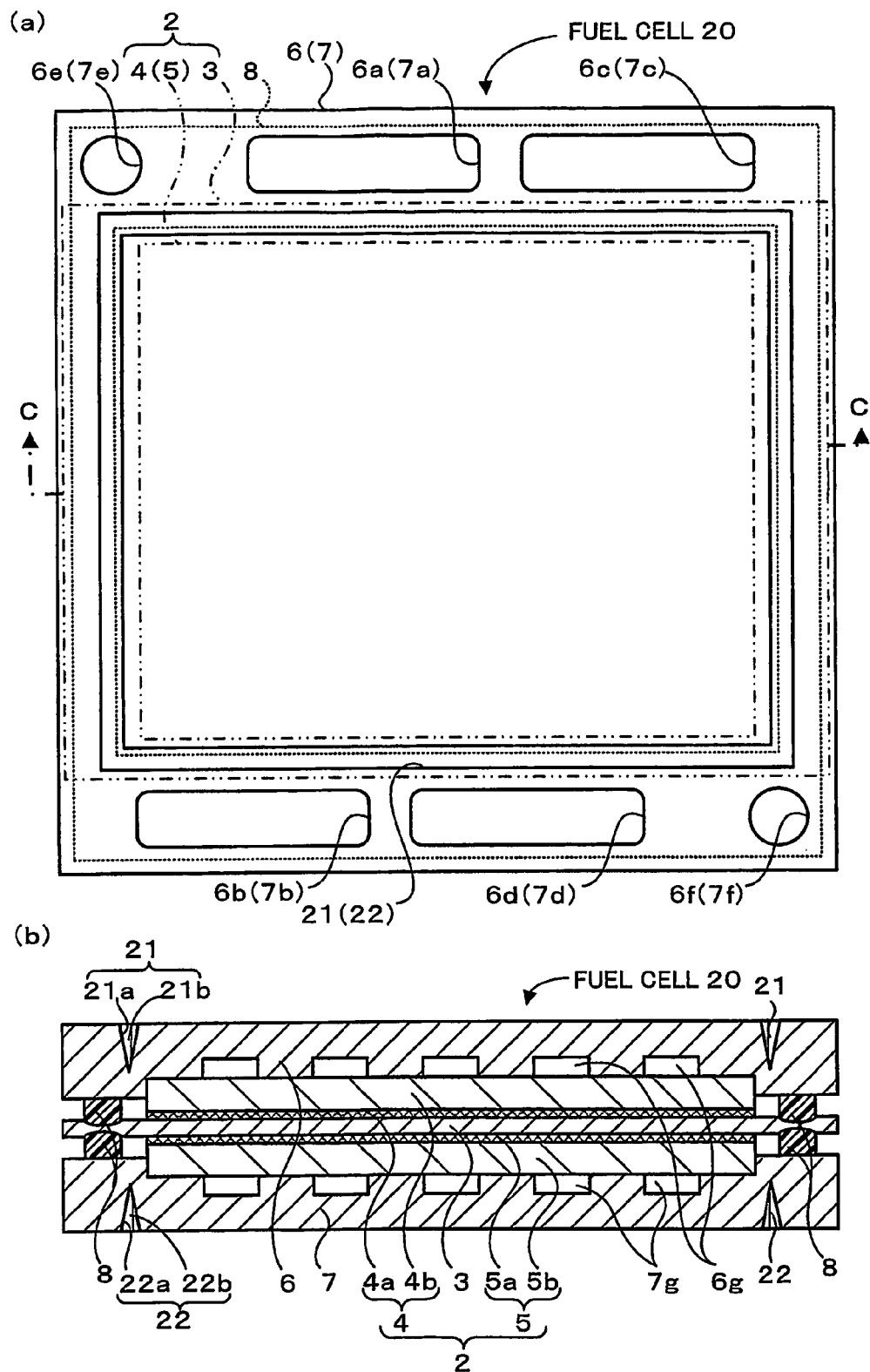
FIG. 10 schematically illustrates the structure of a fuel cell in a second embodiment.

FIG. 10 schematically illustrates the structure of a fuel cell 20 in a second embodiment of the invention. FIG. 10(a) is a plan view, and FIG. 10(b) is a sectional view taken on a line C-C of FIG. 10(a).

The fuel cell 20 of this embodiment is a polymer electrolyte fuel cell and includes, as main constituents, an MEA 2 having an electrolyte membrane 3 interposed between a pair of electrodes 4 and 5, a pair of separators 6 and 7 arranged across the MEA 2, sealing members 8 located to surround the outer circumference of the MEA 2, and breaking guides 21 and 22 used for breakage of both the separators 6 and 7. The structures of the MEA 2, the separators 6 and 7, and the sealing members 8 are identical with those of the first embodiment and are thus not specifically described here. The like elements to those of the first embodiment are expressed by the like numerals and symbols.

The breaking guides 21 and 22 have recesses 21a and 22a formed on the other planes of the separators 6 and 7 opposite to the planes facing the MEA 2 to be continuous around the peripheries of the respective separators 6 and 7. The recesses 21a and 22a are filled with filling members 21b and 22b of a higher hardness material. The recesses 21a and 22a are formed to have wedge-like cross sections, more specifically, quasi-V-shaped cross sections, in depth of the separators 6 and 7. The higher hardness material has a higher hardness than that of the separators 6 and 7, which are made of gas-impermeable molded carbon obtained by compression of carbon, and is, for example, a metal or artificial graphite fired at high temperature (for example, temperature of not less than 2500° C.). The filling members 21b and 22b of the higher hardness material have electrical conductivity equivalent to or higher than that of the separators 6 and 7. The recesses 21a and 22a are filled with the filling members 21b and 22b of the higher hardness material to make the surfaces of the respective separators 6 and 7 substantially flat and even. The recesses 21a and 22a formed in the separators 6 and 7 may subsequently be filled with the filling members 21b and 22b of the higher hardness material. Otherwise specific portions of the separators 6 and 7 corresponding to the breaking guides 21 and 22 may be physically or chemically processed or treated (for example, heat treatment or chemical treatment) to be modified and have a higher hardness.

Figure 11:
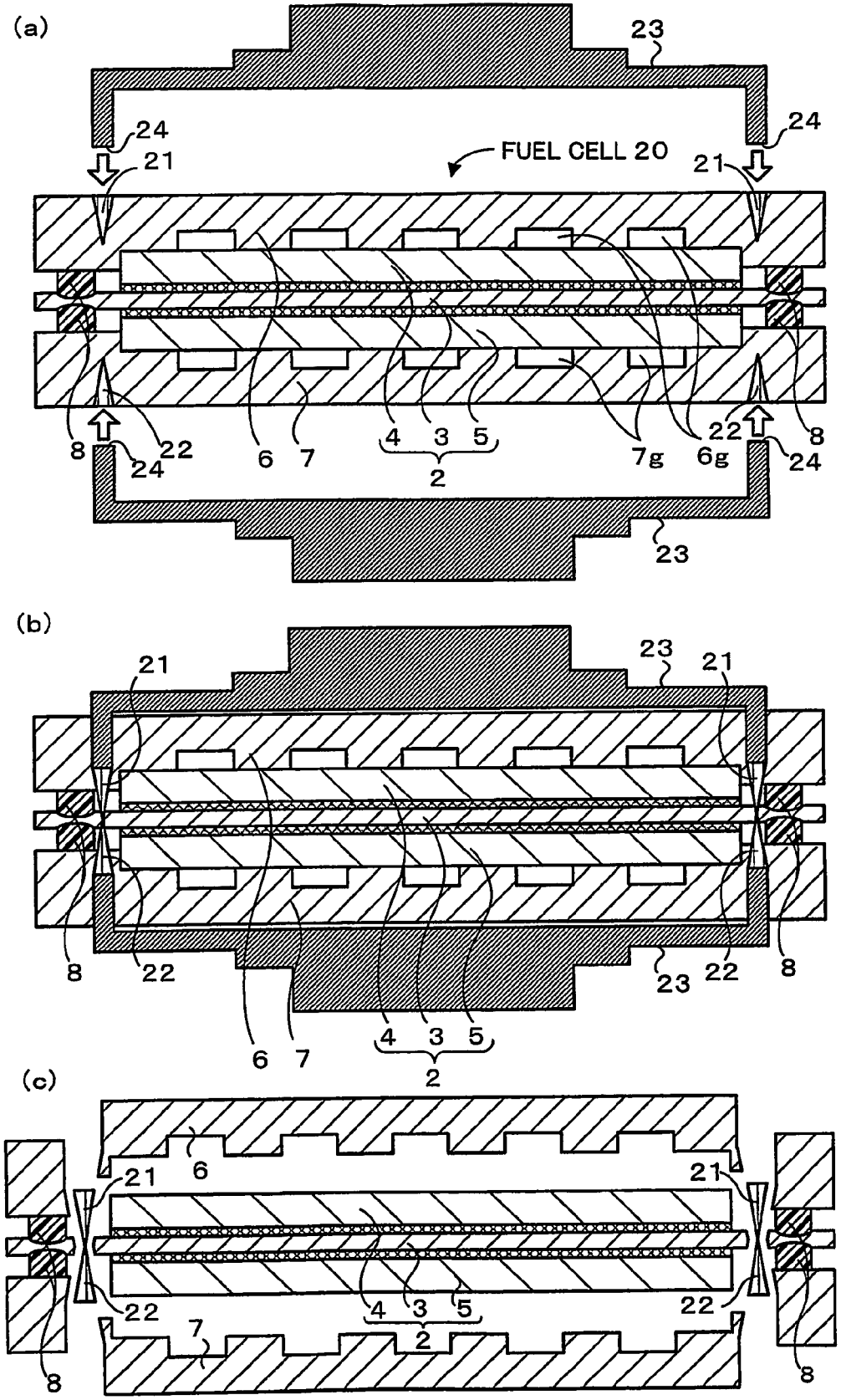
FIG. 11 shows a disassembly procedure of the fuel cell in the second embodiment.

A disassembly procedure of disassembling the fuel cell 20 is described below with reference to FIG. 11. FIG. 11 shows the disassembly procedure of the fuel cell 20. The procedure first places two dumbbell-like cracking tools 23, 23 to face the separators 6 and 7, as shown in FIG. 11(*a*). Each of the dumbbell-like cracking tools 23 has a pressing member 24 with a pressing face equivalent to the exposure area of the breaking guide 21 or 22 on the separator 6 or 7. More specifically, one of the cracking tools 23 facing the separator 6 is set to position its pressing member 24 opposite to the breaking guide 21, whereas the other of the cracking tools 23 facing the separator 7 is set to position its pressing member 24 opposite to the breaking guide 22. The procedure then shifts the two cracking tools 23, 23 to approach to each other and causes the pressing members 24, 24 of the cracking tools 23, 23 to apply force to the corresponding breaking guides 21 and 22, as shown in FIG. 11(*b*). More specifically, the upper cracking tool 23 is shifted downward to be pressed against the separator 6, while the lower cracking tool 23 is shifted upward to be pressed against the separator 7. The breaking guide 21 formed on the separator 6 has the higher hardness than the separator 6 and is pressed by the cracking tool 23 to deeply go into the depth of the separator 6, whereas the breaking guide 22 formed on the separator 7 has the higher hardness than the separator 7 and is pressed by the cracking tool 23 to deeply go into the depth of the separator 7. The downward and upward shifts of the cracking tools 23, 23 stop when the ends of the pressed breaking guides 21 and 22 come into contact with each other. The separators 6 and 7 are accordingly broken at the positions of the breaking guides 21 and 22, and the electrolyte membrane 3 of the MEA 2 is simultaneously broken. The procedure then removes the broken separators 6 and 7 to expose the part of the MEA 2 with the anode 4 and the cathode 5 for disassembly, as shown in FIG. 11(*c*).

As described above, in the structure of the fuel cell 20 of the second embodiment, when disassembly of the fuel cell 20 is demanded, the heterogeneous properties of the breaking guides 21 and 22 are utilized to break the separators 6 and 7. This arrangement ensures easy disassembly of the fuel cell 20 when required. The separators 6 and 7 are broken at the respective positions outside the electrodes 4 and 5 but inside the sealing members 8. The electrodes 4 and 5 of the MEA 2 are thus recoverable and recyclable, while being hardly damaged. The breaking guides 21 and 22 are formed on the other planes of the separators 6 and 7 opposite to the planes facing the MEA 2. This arrangement ensures easy access to the breaking guides 21 and 22 and facilitates formation of the breaking guides 21 and 22 on the wide area of the opposite planes of the separators 6 and 7. The breaking guides 21 and 22 are formed to make the surfaces of the separators 6 and 7 substantially flat and even. Compared with the structure of the first embodiment with the concave breaking guides, this flat and even structure advantageously has the higher strength. The breaking guides 21 and 22 formed to have the wedge-like cross sections readily go into the depths of the separators 6 and 7 and are cracked when being pressed by the corresponding cracking tools 23, 23. The breaking guides 21 and 22 have the filling members 21*b* and 22*b* of the higher hardness material having the higher hardness than that of the separators 6 and 7, so that the separators 6 and 7 are easily broken when the breaking guides 21 and 22 are pressed in the depths of the respective separators 6 and 7 by the corresponding cracking tools 23, 23. The breaking guides 21 and 22 have substantially equivalent electrical conductivity to that of the separators 6 and 7. In a fuel cell stack having multiple fuel cells 20 laid one upon another, this arrangement ensures a sufficiently large contact area of the adjoining fuel cells and a sufficiently high electrical conductivity.

In the structure of the second embodiment discussed above, the breaking guides 21 and 22 are formed on both the separators 6 and 7. The breaking guide may alternatively be formed on only one of the separators. In this modified structure, after breakage of one of the separators, the electrolyte membrane 3 is cut for disassembly on a cut line positioned outside the electrodes 4 and 5 but inside the sealing members 8, like the procedure of the first embodiment.

The above description regards the disassembly procedure of one fuel cell 20. Multiple fuel cells 20 may be disassembled simultaneously, as in the modified procedure of FIG. 9.

Figure 12:
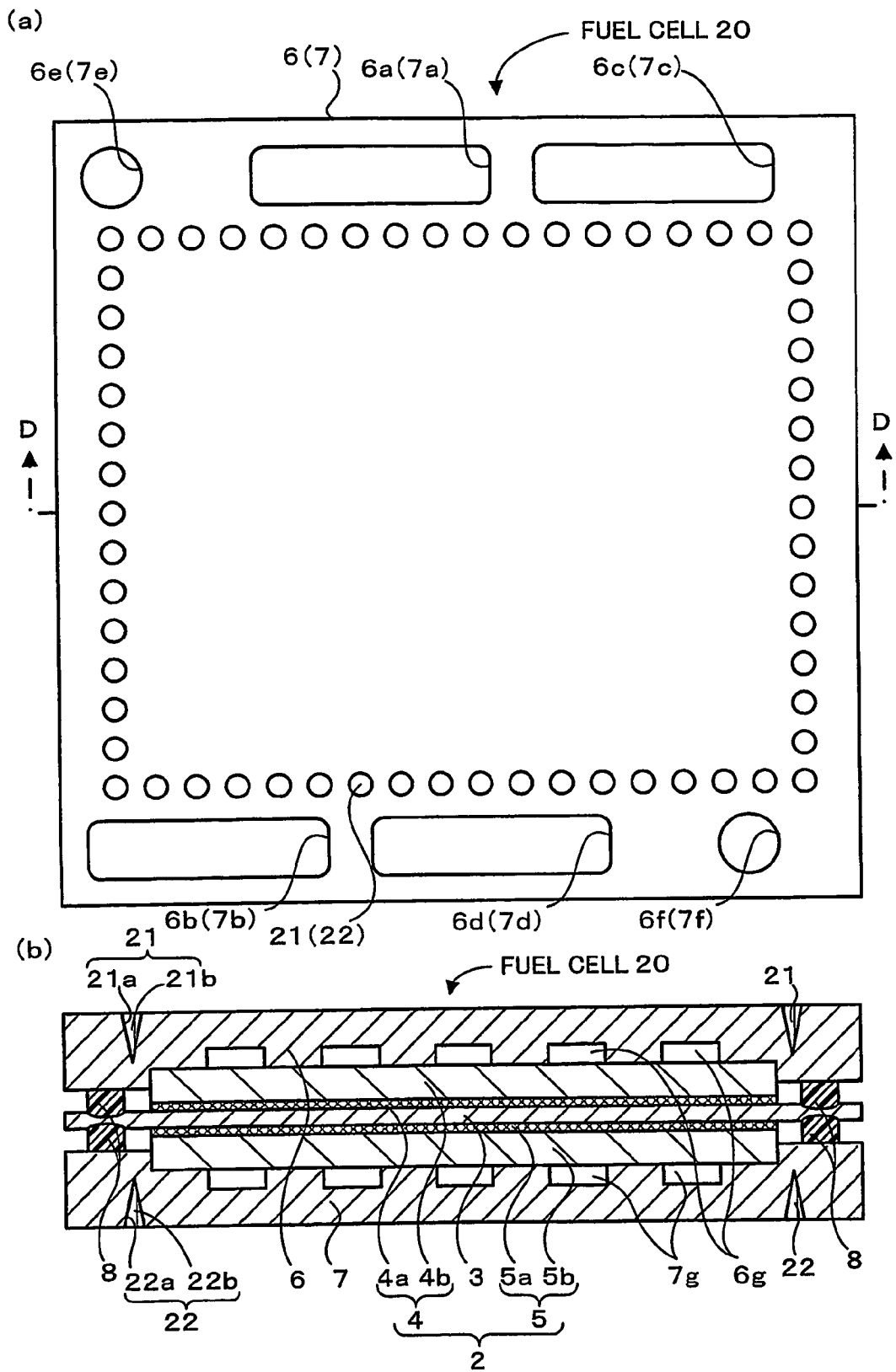
FIG. 12 shows the structure of one modified example of the fuel cell in the second embodiment.
Figure 13:
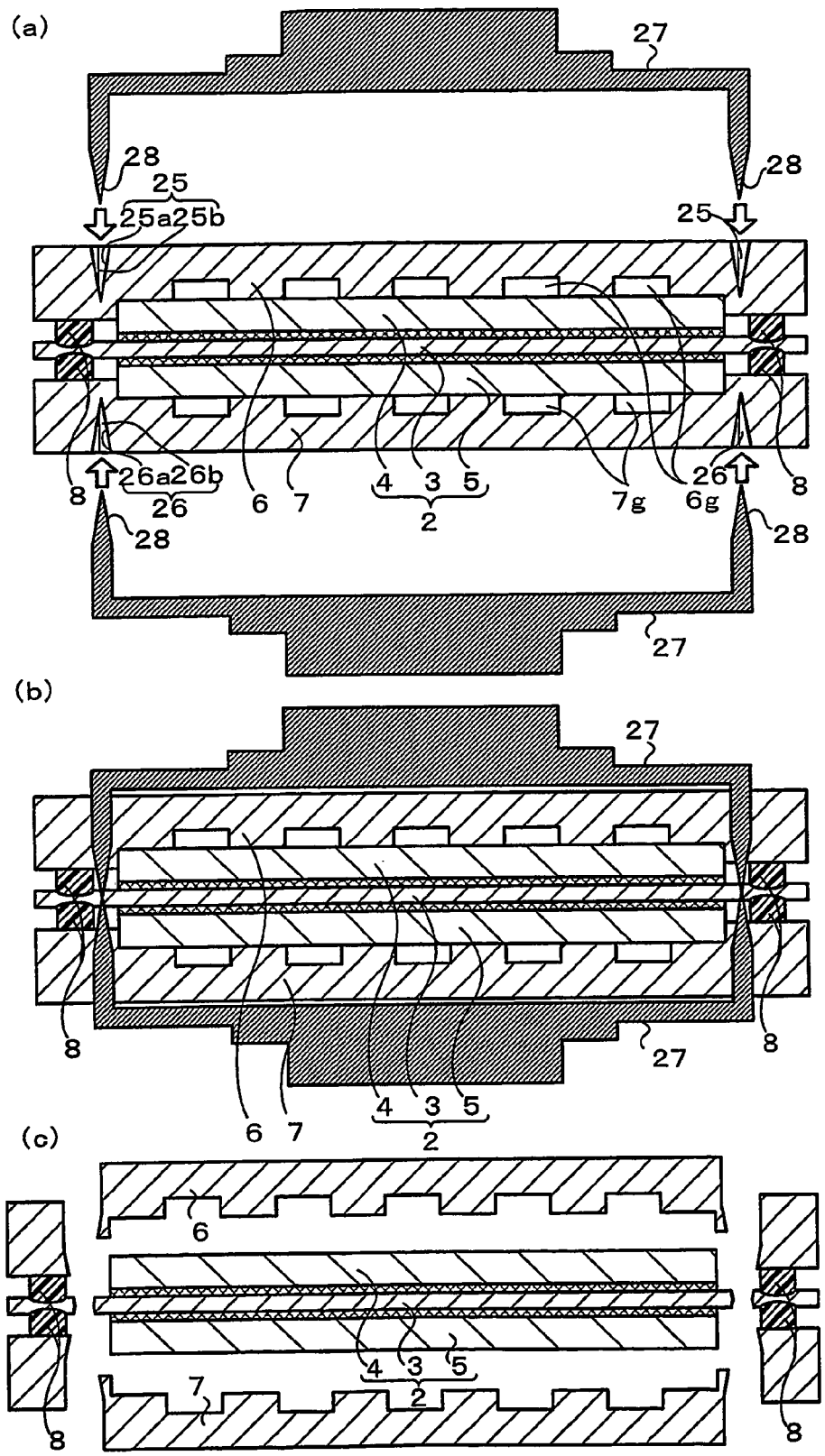
FIG. 13 shows a disassembly procedure of one modified example of the fuel cell.

In the structure of the second embodiment discussed above, the breaking guides 21 and 22 are formed continuously around the peripheries of the respective separators 6 and 7. These breaking guides may alternatively be formed intermittently. In the structure of one modified example shown in FIG. 12, breaking guides 21 having multiple circular exposure areas on the separator 6 are dotted around the periphery of the separator 6. The cracking tool 23 has multiple pressing members 24 dotted corresponding to the breaking guides 21. The exposure areas of the breaking guides 21 are not restricted to the circular shape but may be a polygonal shape (for example, a hexagonal shape) with an angle of two facing vertexes of the polygon set to be less than 90 degrees (for example 40 to 60 degrees) (see FIG. 4). When an external force is applied onto the breaking guides 21 by the pressing members 24 of the cracking tool 23, cracks readily start from the sharp vertexes and are extended in the direction of the face of the separator 6. This facilitates disassembly of the fuel cell 20. In this modified structure, the breaking guides 21 may be arranged at intervals that enable linkage of the cracks on the separator 6 in the direction of its face for breakage. The breaking guides 21 may have long exposure areas. The description above is also applicable to breaking guides 22. In the structure of the second embodiment discussed above, the breaking guides 21 and 22 have the filling members 21*b* and 22*b* of the higher hardness material having the higher hardness than that of the separators 6 and 7. The breaking guides may, however, be made of a lower hardness material having a lower hardness than that of the separators 6 and 7. In the structure of another modified example shown in FIG. 13, breaking guides 25 and 26 have recesses 25*a* and 26*a* of quasi-V-shaped (wedge-like) cross sections, which are filled with filling members 25*b* and 26*b* of a different material from that of the separators 6 and 7, like the second embodiment. The filling members 25*b* and 26*b* are composed of a material having a lower hardness and an equivalent electrical conductivity to separators 6 and 7, for example, a conductive plastic. The disassembly procedure of the fuel cell of this modified structure first provides two dumbbell-like cracking tools 27 having pressing members 28 of quasi-V-shaped cross sections, like the shape of the breaking guides 25 and 26, and places the two dumbbell-like cracking tools 27, 27 to face the separators 6 and 7, as shown in FIG. 13(*a*). Each of the cracking tools 27 is made of a material having a higher hardness than that of the breaking guides 25 and 26. The procedure then shifts the two cracking tools 27, 27 to approach to each other and causes the pressing members 28, 28 of the cracking tools 27, 27 to apply force to the corresponding breaking guides 25 and 26, as shown in FIG. 13(*b*). The V-shaped edges of the pressing members 28 run through and destroy the breaking guides 25 and 26 and go into the depths of the separators 6 and 7. The downward and upward shifts of the cracking tools 27, 27 stop when the ends of the opposed pressing members 28, 28 come into contact with each other. The separators 6 and 7 are accordingly broken at the positions of the breaking guides 25 and 26, and the electrolyte membrane 3 of the MEA 2 is simultaneously broken. The procedure then removes the broken separators 6 and 7 to expose the part of the MEA 2 with the anode 4 and the cathode 5 for disassembly, as shown in FIG. 13(c). This modified structure exerts the substantially similar functions and effects to those of the second embodiment discussed above.

Third Embodiment

Figure 14:
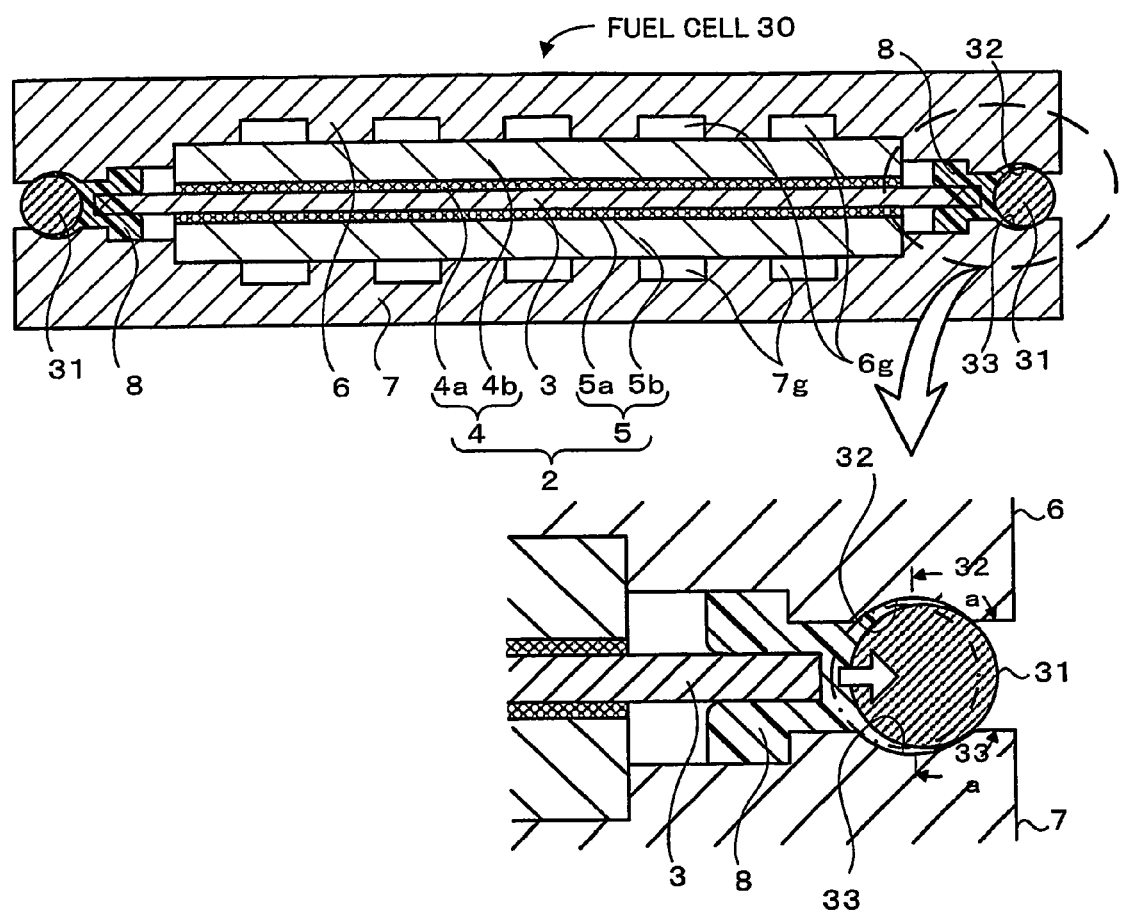
FIG. 14 is a sectional view schematically illustrating the structure of a fuel cell in a third embodiment.

FIG. 14 is a sectional view schematically illustrating the structure of a fuel cell 30 in a third embodiment of the invention. Like the sectional view of FIG. 1(b) in the first embodiment, this sectional view shows a cross section of the fuel cell cut in the direction of depth.

The fuel cell 30 of this embodiment is a polymer electrolyte fuel cell and includes, as main constituents, an MEA 2 having an electrolyte membrane 3 interposed between a pair of electrodes 4 and 5, a pair of separators 6 and 7 arranged across the MEA 2, sealing members 8 located to surround the outer circumference of the MEA 2, and breaking guides 31 used for breakage of both the separators 6 and 7. The structures of the MEA 2, the separators 6 and 7, and the sealing members 8 are identical with those of the first embodiment and are thus not specifically described here. The like elements to those of the first embodiment are expressed by the like numerals and symbols.

The breaking guides 31 are round bar members of a quasi-circular cross section and are arranged around the peripheries of the separators 6 and 7 to be located outside the sealing members 8 in a gap defined by the pair of separators 6 and 7. The breaking guides 31 are placed not to interfere with smooth feeds and discharges of the fuel gas and the oxidizing gas. More specifically, the breaking guides 31 are placed to exclude the position of connecting a fuel gas conduit 6g with a fuel gas supply inlet, the position of connecting the fuel gas conduit 6g with a fuel gas discharge outlet, the position of connecting an oxidizing gas conduit 7g with an oxidizing gas supply inlet, and the position of connecting the oxidizing gas conduit 7g with an oxidizing gas discharge outlet. The breaking guides 31 are thus arranged intermittently. The breaking guides 31 are made of a dielectric material having a higher hardness than that of the separators 6 and 7, which are made of gas-impermeable molded carbon obtained by compression of carbon, for example, a ceramic material like alumina, zirconia, aluminum nitride, silicon nitride, or silicon carbide. The separators 6 and 7 have arc-shaped concave faces 32 and 33 having a slightly greater diameter than the diameter of the quasi-circular cross section of the breaking guides 31 to receive the breaking guides 31 therein. The concave faces 32 and 33 for receiving the breaking guides 31 therein are formed to vary the gap between the separators 6 and 7. The gap between the separators 6 and 7 first gradually increases along the concave faces 32 and 33 from their inward ends to their approximate centers and then gradually decreases along the concave faces 32 and 33. In the structure of the embodiment, specific portions of the concave faces 32 and 33 from the approximate centers toward the ends of the separators 6 and 7 are called gradual-varying portions 32a and 33a. In the process of assembly of the fuel cell 30, an excess amount of an adhesive may be applied to form the sealing members 8. When the excess amount of the adhesive presses the breaking guide 31 (shown by the one-dot chain line) outward (in the direction of the arrow), the breaking guide 31 comes into contact with the gradual-varying portions 32a and 33a of the concave faces 32 and 33 as shown by the solid line in the enlarged view of FIG. 14. The presence of the gradual-varying portions 32a and 33a of the concave faces 32 and 33 thus effectively prevents leakage of the adhesive or the resulting sealing members 8 out of the separators 6 and 7.

A disassembly procedure of disassembling the fuel cell 30 is described below with reference to FIG. 15. FIG. 15 shows the disassembly procedure of the fuel cell 30. The procedure first places two dumbbell-like cracking tools 34, 34 having practically the same size as that of the anode 4 and the cathode 5 of the MEA 2 to be in contact with the separators 6 and 7, as shown in FIG. 15(a). More specifically, one cracking tool 34 is set to be in contact with an area of the separator 6 corresponding to the anode 4, while the other cracking tool 34 is set to be in contact with an area of the separator 7 corresponding to the cathode 5. The procedure then applies a vertical clamping force to the fuel cell 30 by the two cracking tools 34, 34, as shown in FIG. 15(b). Namely the two cracking tools 34, 34 apply a pressing force to the fuel cell 30 in a direction of narrowing the gap between the separators 6 and 7. The breaking guides 31 work to prevent the gap between the separators 6 and 7 from being narrowed less than a preset width (depending upon the diameter of the breaking guides 31). A large force is, however, applied to specific positions of the separators 6 and 7 corresponding to the peripheries of the cracking tools 34, 34. With an increase in pressing force, the specific positions of the separators 6 and 7 are ripped down. The separators 6 and 7 are accordingly broken by the peripheries of the cracking tools 34, 34. The procedure subsequently removes the broken separators 6 and 7 and cuts the sealing members 8 off the MEA 2 for recovery and recycle of the anode 4 and the cathode 5 of the MEA 2.

As described above, in the structure of the fuel cell 30 of the third embodiment, when disassembly of the fuel cell 30 is demanded, the breaking guides 31 are utilized to break the separators 6 and 7. This arrangement ensures easy disassembly of the fuel cell 30 when required. The separators 6 and 7 are broken at the respective positions outside the electrodes 4 and 5 but inside the sealing members 8. The electrodes 4 and 5 of the MEA 2 are thus recoverable and recyclable, while being hardly damaged. The breaking guides 31 are made of the dielectric material having the higher hardness than that of the separators 6 and 7. The separators 6 and 7 are thus readily broken by applying a pressing force in a direction of narrowing the gap between the separators 6 and 7 by the two cracking tools 34, 34. The dielectric material of the breaking guides 31 desirably prevents electrical connection between the anode 4 and the cathode 5 via the breaking guides 31. The breaking guides 31 further work to prevent leakage of the sealing members 8.

In the structure of the third embodiment discussed above, the two cracking tools 34, 34 are pressed against the top face and the bottom face of the fuel cell 30. One modified procedure may press the cracking tool 34 against the separator 6 to break only the separator 6, while the separator 7 of the fuel cell 30 is mounted on a plane.

The above description regards the disassembly procedure of one fuel cell 30. Multiple fuel cells 30 may be disassembled simultaneously, as in the modified procedure of FIG. 9.

In the structure of the third embodiment discussed above, the breaking guides 31 have the quasi-circular cross sections and are received by the arc-shaped concave faces 32 and 33. FIGS. 16(a) to 16(c) show other available structures of the breaking guide and its receiving member as modified examples. The structure of one modified example shown in FIG. 16(a) replaces the concave faces 32 and 33 with tapered portions 35 and 36 of the separators 6 and 7, while adopting the breaking guides 31 of the quasi-circular cross sections, like the third embodiment. The tapered portions 35 and 36 are designed to narrow the gap between the separators 6 and 7 toward the ends of the separators 6 and 7. This modified structure effectively prevents the sealing members 8 from leaking out of the separators 6 and 7, like the structure of the third embodiment. This modified structure also enables the separators 6 and 7 to be readily broken by the two cracking tools 34, 34. The structure of another modified example shown in FIG. 16(*b*) adopts the tapered portions 35 and 36 like the structure of FIG. 16(*a*), but uses breaking guides 37 of a quasi-trapezoidal cross section with oblique sides of the trapezoid substantially conforming to the tapered portions 35 and 36. This modified structure effectively prevents the sealing members 8 from leaking out of the separators 6 and 7, like the structure of the third embodiment. This modified structure also enables the separators 6 and 7 to be readily broken by the two cracking tools 34, 34. The structure of still another modified example shown in FIG. 16(*c*) adopts breaking guides 38 of a polygonal cross section (a rectangular cross section), while not adopting the concave faces 32 and 33 or the tapered portions 35 and 36. This modified structure enables the separators 6 and 7 to be readily broken by the cracking tools 34, 34, while having no significant effects on prevention of leakage of the sealing members 8.

Fourth Embodiment

Figure 17:
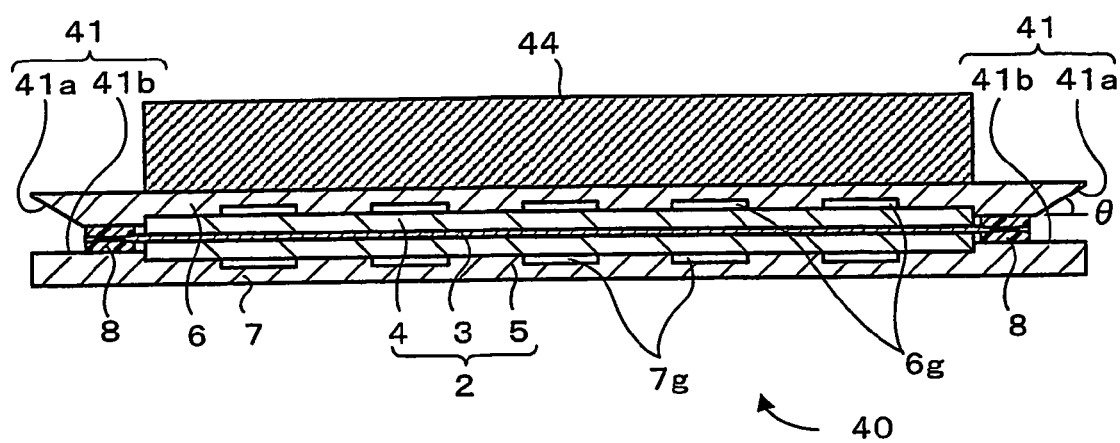
FIG. 17 is a sectional view schematically illustrating the structure of a fuel cell in a fourth embodiment.

FIG. 17 is a sectional view schematically illustrating the structure of a fuel cell 40 in a fourth embodiment of the invention. Like the sectional view of FIG. 1(*b*) in the first embodiment, this sectional view shows a cross section of the fuel cell cut in the direction of depth.

The fuel cell 40 of this embodiment is a polymer electrolyte fuel cell and includes, as main constituents, an MEA 2 having an electrolyte membrane 3 interposed between a pair of electrodes 4 and 5, a pair of separators 6 and 7 arranged across the MEA 2, sealing members 8 located to surround the outer circumference of the MEA 2, and a breaking guide 41 used for breakage of one of the separators 6. The structures of the MEA 2, the separators 6 and 7, and the sealing members 8 are identical with those of the first embodiment and are thus not specifically described here. The like elements to those of the first embodiment are expressed by the like numerals and symbols. The breaking guide 41 includes an inclined face 41*a* formed on the separator 6 to gradually expand the gap between the pair of separators 6 and 7 from the outer end position of the sealing members 8 toward the end of the separator 6, and a horizontal face 41*b* formed on the separator 7 to be opposed to the inclined face 41*a*. An angle of inclination θ of the inclined face 41*a* of the breaking guide 41 is set to be not less than an angle of gradient α of a sloped edge of a cracking tool 43. The inclined face 41*a* in combination with the horizontal face 41*b* makes a space for receiving the sloped edge of the cracking tool 43 inserted into the gap between the separators 6 and 7. The horizontal face 41*b* also has a function of guiding a horizontal plane of the sloped edge of the cracking tool 43, which is opposite to the oblique plane.

Figure 18:
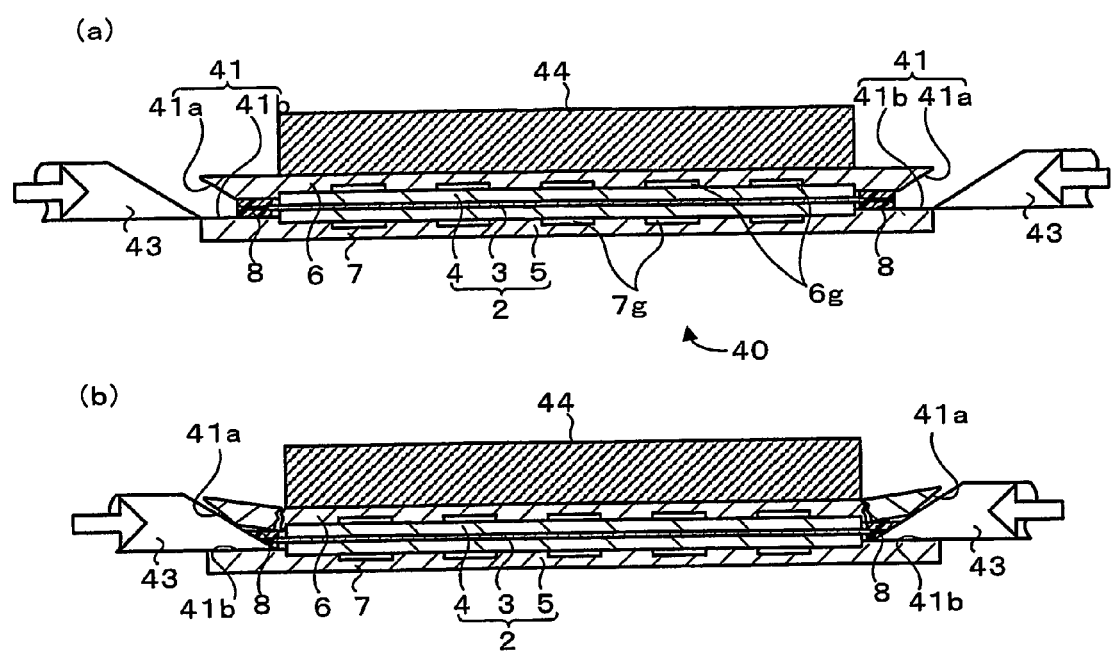
FIG. 18 shows a disassembly procedure of the fuel cell in the fourth embodiment.

A disassembly procedure of disassembling the fuel cell 40 is described below with reference to FIG. 18. FIG. 18 shows the disassembly procedure of the fuel cell 40. The procedure first provides a dumbbell-like weight 44 having practically the same size as that of the anode 4 and the cathode 5 of the MEA 2 and places the weight 44 in an area on an upper face of the separator 6 corresponding to the anode 4, as shown in FIG. 18(*a*). The weight 44 applies a force in the direction of narrowing the gap between the separators 6 and 7. An additional load in the same direction may be applied to the weight 44 according to the requirements. The procedure subsequently provides two cracking tools 43, 43 and places the two cracking tools 43, 43 with the respective sloped edges to face one pair of opposing sides of the separator 6. The procedure then inserts the sloped edges of the respective cracking tools 43 into the depths of the gaps between the separators 6 and 7, as shown in FIG. 18(*b*). More specifically, each of the cracking tools 43 is inserted into the depth of the gap between the separators 6 and 7, while the lower horizontal plane of the sloped edge of the cracking tool 43, which is opposite to the oblique plane, moves along the horizontal face 41*b* of the breaking guide 41. The oblique plane of the sloped edge of each cracking tool 43 comes into contact with the separator 6, slightly after the sloped edge of the cracking tool 43 passes through the inclined face 41*a* and goes into the sealing members 8. A subsequent increase of the forces applied to the cracking tools 43 in the respective directions of insertion gives an upward bending force to specific positions of the separator 6 corresponding to the periphery of the weight 44. A further increase in applied force eventually rips down the separator 6 at the specific positions. The procedure then places the two cracking tools 43, 43 with the respective sloped edges to face the other pair of opposing sides of the separator 6 and inserts the sloped edges of the respective cracking tools 43 into the depths of the gaps between the separators 6 and 7 to rip down the separator 6. The procedure subsequently removes the broken separator 6 and cuts the sealing members 8 off the MEA 2 for recovery and recycle of the anode 4 and the cathode 5 of the MEA 2. In the structure of this embodiment, the length and the angle of gradient α of the sloped edge of each cracking tool 43 are set to ensure breakage of the separator 6, before the sloped edge of the cracking tool 43 reaches the anode 4 and the cathode 5 of the MEA 2.

As described above, in the structure of the fuel cell 40 of the fourth embodiment, when disassembly of the fuel cell 40 is demanded, the breaking, guide 41 is utilized to break the separator 6. This arrangement ensures easy disassembly of the fuel cell 40 when required. The separator 6 is broken at the position outside the electrodes 4 and 5 but inside the sealing members 8. The electrodes 4 and 5 of the MEA 2 are thus recoverable and recyclable, while being hardly damaged. The angle of inclination θ of the inclined face 41*a* of the breaking guide 41 is set to be not less than the angle of gradient α of the sloped edge of the cracking tool 43. This arrangement restricts the potential of bringing the sloped edge of the cracking tool 43 into contact with the inclined face 41*a* of the breaking guide 41. There is accordingly little possibility that the inclined face 41*a* of the separator 6 is broken by the cracking tool 43. The cracking tool 43 is inserted into the depth of the gap between the separators 6 and 7, while the lower horizontal plane of the sloped edge of the cracking tool 43, which is opposite to the oblique plane, moves along the horizontal face 41*b* of the breaking guide 41. This arrangement effectively prevents the cracking tool 43 from being moved unstably along the vertical axis.

Figure 19:
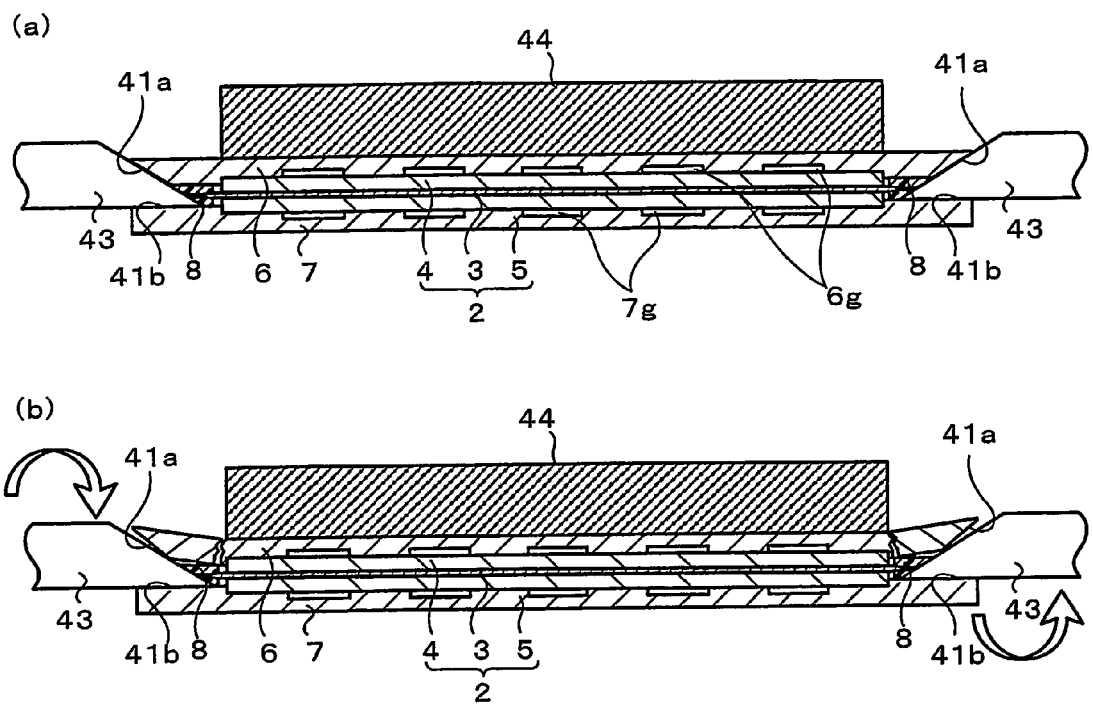
FIG. 19 shows one modified example of a disassembly procedure of the fuel cell.

In the structure of the fourth embodiment discussed above, the separator 6 is ripped down by inserting the cracking tools 43, 43 into the depths of the gaps between the separators 6 and 7. In one modified structure shown in FIG. 19, the procedure twists the cracking tools 43, 43 set in the gaps between the separators 6 and 7 (see FIG. 19(*a*)). The twisting action produces a bending force at specific positions of the separator 6 corresponding to the periphery of the weight 44, so as to rip down the separator 6 at the specific positions (see FIG. 19(*b*)).

Portions of the separators 6 and 7 having a fuel gas supply inlet, a fuel gas discharge outlet, an oxidizing gas supply inlet, an oxidizing gas discharge outlet, a coolant supply inlet, and a coolant discharge outlet may be cut off, prior to the disassembly of the fuel cell 40. The portions of the separators 6 and 7 with these inlets and outlets have relatively low strength, and may be broken initially by the cracking tools 43. Such unintentional breakage prevents the smooth access to the MEA 2 for recovery and recycle of the anode 4 and the cathode 5 of the MEA 2. The pre-cutting operation avoids such a fear.

Figure 20:
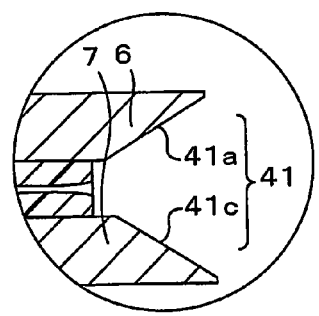
FIG. 20 shows one modified example of a breaking guide in the fuel cell.

In the structure of the fourth embodiment discussed above, the breaking guide 41 includes the inclined face 41a of the separator 6 and the horizontal face 41b of the separator 7. In the structure of another modified example shown in FIG. 20, the horizontal face 41b of the separator 7 may be replaced by an inclined face 41c of the separator 7, which is vertically symmetrical to the inclined face 41a of the separator 6. Namely the breaking guide 41 of this modified structure has the pair of inclined faces 41a, 41c. This modified structure does not allow the cracking tool 43 to be guided by the horizontal face 41b of the separator 7, but otherwise exerts the substantially similar functions and effects to those of the fourth embodiment described above.

Fifth Embodiment

Figure 21:
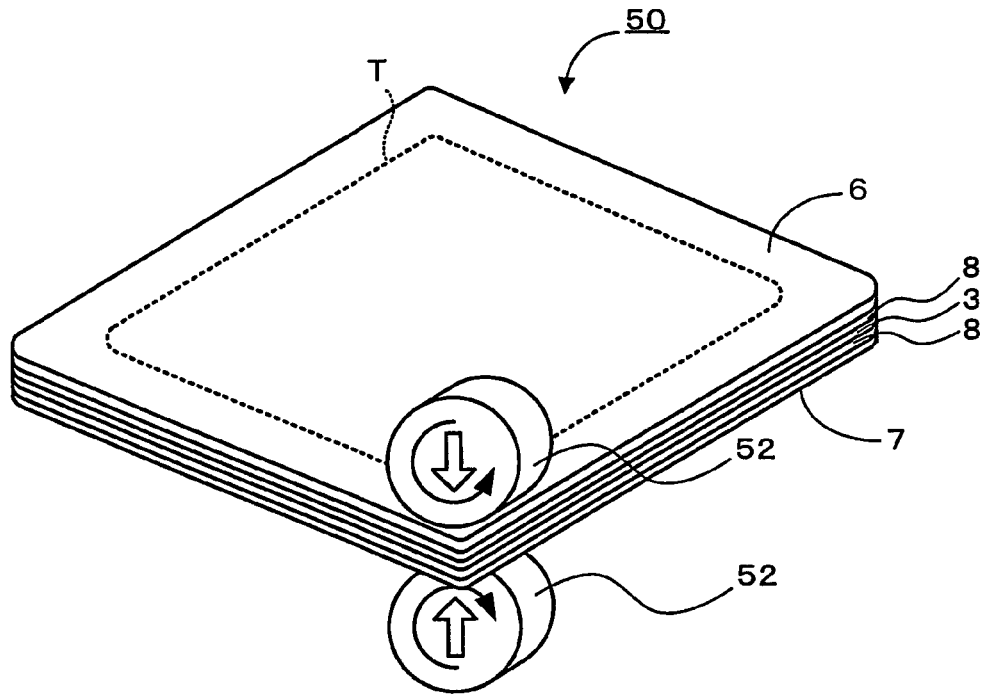
FIGS. 21 and 22 are respectively a perspective view and a side view showing a method of treating the fuel cell in a fifth embodiment.
Figure 22:
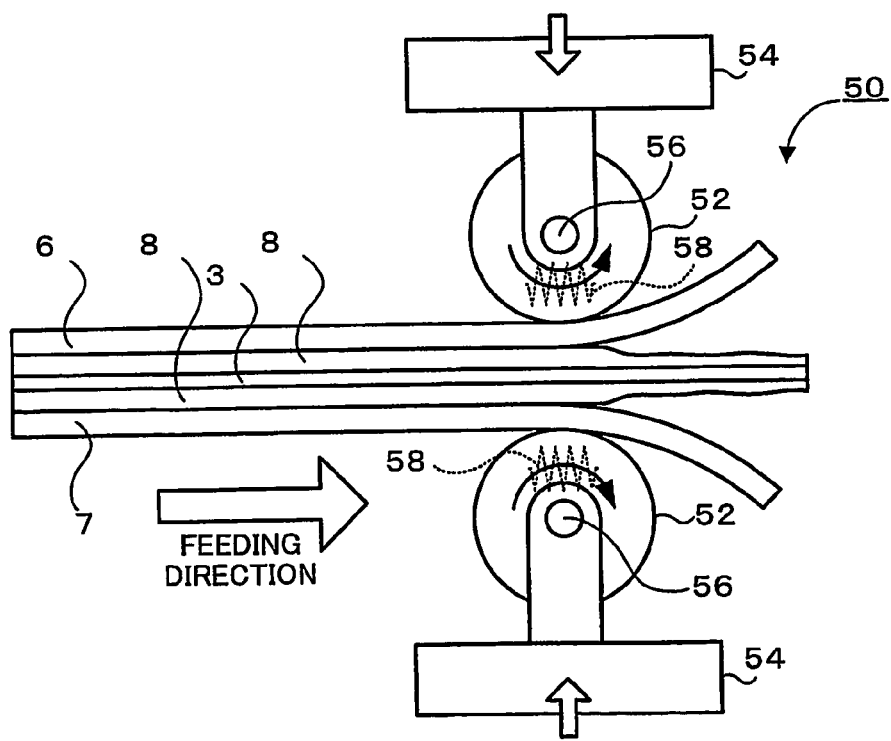

A fifth embodiment of the invention regards a disassembly method of facilitating disassembly of a fuel cell 50, which has the similar structure to that of the fuel cell 10 of the first embodiment except a breaking guide. The structure and the power generation of the fuel cell 50 are practically identical with those of the fuel cell 10 of the first embodiment, except the breaking guide. The like elements are expressed by the like numerals and symbols and are not specifically described here. The separators 6 and 7 in the fuel cell 50 of the fifth embodiment are made of a metal, instead of carbon. The disassembly procedure of disassembling the fuel cell 50 in this embodiment is described below with reference to FIGS. 21 and 22. FIGS. 21 and 22 are respectively a perspective view and a side view showing a method of treating the fuel cell 50 with a pair of pressure rollers 52. As shown in FIG. 22, the pair of pressure rollers 52, 52 respectively have built-in heaters 58 and are attached in a rotatable manner to rotating shafts 56 fixed to support bases 54. The two support bases 54 are designed to be movable closer to and apart from each other by means of a ball screw mechanism. The method first places a specific area along a trace line T on the outer faces of the separators 6 and 7, which corresponds to the area of the sealing members 8, between the pair of pressure rollers 52, 52. More specifically, the method specifies one of the four corners of the trace line T as a starting point and places the starting point between the pair of pressure rollers 52, 52. The method then moves the support bases 54, 54 closer to each other to apply a preset pressure at the starting point. The pressure is set to a magnitude that causes warpage of the separators 6 and 7 in directions away from each other. The method supplies power to the built-in heaters 58 in the respective pressure rollers 52 to heat the pressure rollers 52 to a preset temperature. The temperature is set to be not less than a softening temperature or a melting temperature of the sealing members 8 but less than an allowable temperature limit of the electrolyte membrane 3. The specific area of the fuel cell 50 along the trace line T is sequentially placed between the pair of pressure rollers 52, 52. The specific area of the fuel cell 50 passing through the pressure rollers 52, 52 is heated to soften and melt the sealing members 8 and lower the adhesive power of the sealing members 8, while being pressed to cause warpage of the separators 6 and 7 in the directions away from each other. The whole circumferences of the respective separators 6 and 7 are thus separate from each other. The method then removes the separators 6 and 7 and collects the MEA 2 (with the softened or melted sealing members 8) for recovery and recycle.

As described above, the method of the fifth embodiment places the separators 6 and 7 between the pair of pressure rollers 52, 52 to apply pressure and sequentially shifts the pressing position along the trace line T on the peripheries of the separators 6 and 7. This gives warpage of the separators 6 and 7 in the directions away from each other. A relatively large external force is thus readily applicable to the outer faces of the separators 6 and 7, compared with the prior art structure of applying a force from the inside to the outside of a fuel cell, for example, as disclosed in the document given above as the prior art. This arrangement ensures effective disassembly of the fuel cell 50. The method of this embodiment also softens or melts the sealing members 8 to lower the adhesive power, thus facilitating separation of the separators 6 and 7.

The method of the fifth embodiment utilizes the pair of pressure rollers 52 having the built-in heaters 58. The pressure rollers 52 may, however, not have the built-in heaters 58. In this modified structure, the method may use separate heaters to soften or melt the sealing members 8 with application of heat, while actuating the pressure rollers 52, 52 to apply pressure to the separators 6 and 7 and give warpage of the separators 6 and 7 in the directions away from each other. The method may otherwise cause warpage of the separators 6 and 7 with only application of pressure, while not heating the sealing members 8.

Figure 23:
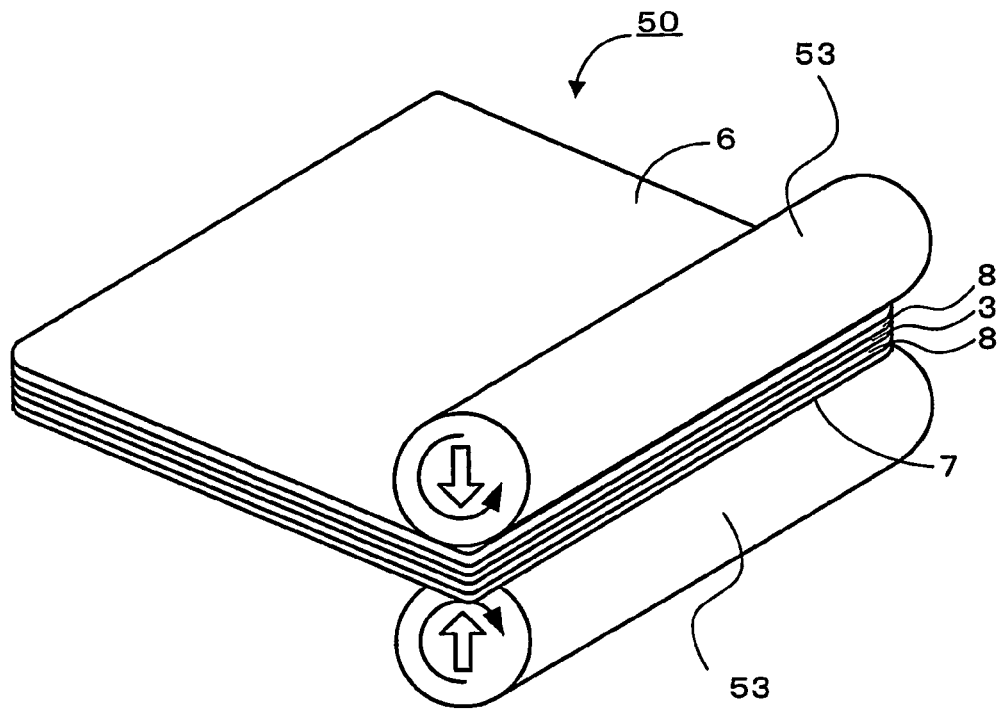
FIG. 23 shows one modified example of the method of treating the fuel cell.

The method of the fifth embodiment sequentially places the specific area of the fuel cell 50 along the trace line T between the pair of pressure rollers 52, 52. One modified procedure may place the separators 6 and 7 between a pair of pressure rollers 53, 53 having an axial length practically identical with the length of one side of the fuel cell 50 to apply pressure and sequentially shift the pressing position, as shown in FIG. 23.

Sixth Embodiment

Figure 24:
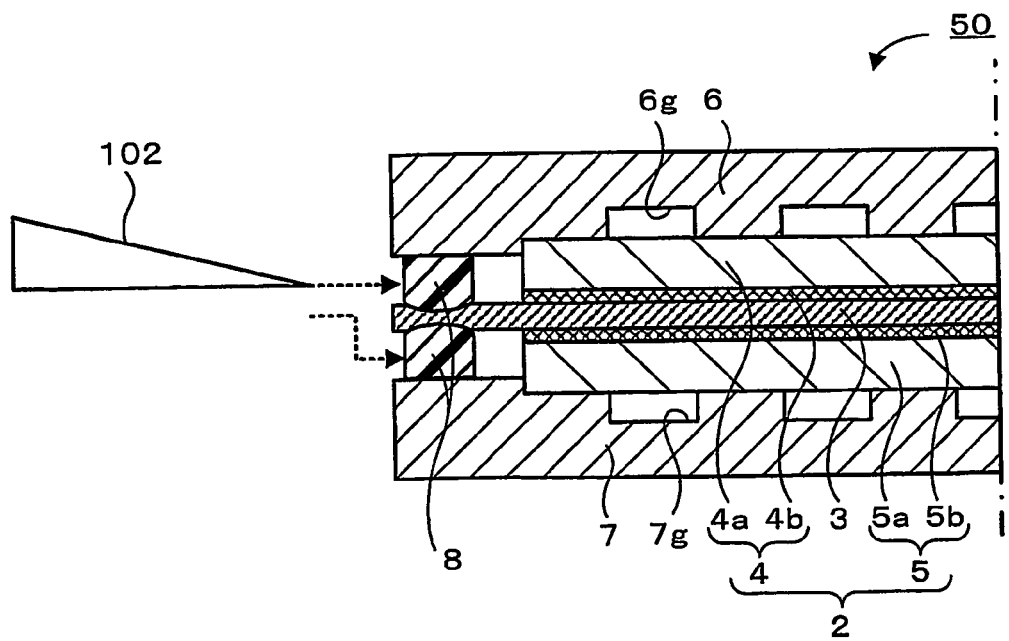
FIG. 24 is a sectional view schematically showing a disassembly method of a fuel cell in a sixth embodiment.

A sixth embodiment of the invention regards another disassembly method of facilitating disassembly of the fuel cell 50. The disassembly procedure of disassembling the fuel cell 50 in this embodiment is described below with reference to FIG. 24. FIG. 24 is a sectional view showing a method of processing the fuel cell 50 with a cutting blade 102. The method first inserts the cutting blade 102 as a cutting tool into the sealing members 8 between the separator 6 and the electrolyte membrane 3 in the gap between the separators 6 and 7 to cut the sealing members 8 off. The method subsequently draws the cutting blade 102 out and inserts the cutting blade 102 into the sealing members 8 between the separator 7 and the electrolyte membrane 3 in the gap between the separators 6 and 7 to cut the sealing members 8 off. This cutting operation is repeated over the whole circumferences of the fuel cell 50. The sealing members 8 are thus separate from the respective separators 6 and 7 over the whole circumference. The method then removes the separators 6 and 7 and collects the MEA 2 for recovery and recycle.

As described above, the method of the sixth embodiment inserts the cutting blade 102 into the gap between the separators 6 and 7 from outside of the fuel cell 50 to cut the sealing members 8 off. A relatively large external force is thus readily applicable to the sealing members 8 via the cutting blade 102, compared with the prior art structure of applying a force from the inside to the outside of a fuel cell, for example, as disclosed in the document given above as the prior art. This arrangement ensures effective disassembly of the fuel cell 50 to remove the separators 6 and 7 and collect the MEA 2 for recovery and recycle.

Figure 25:
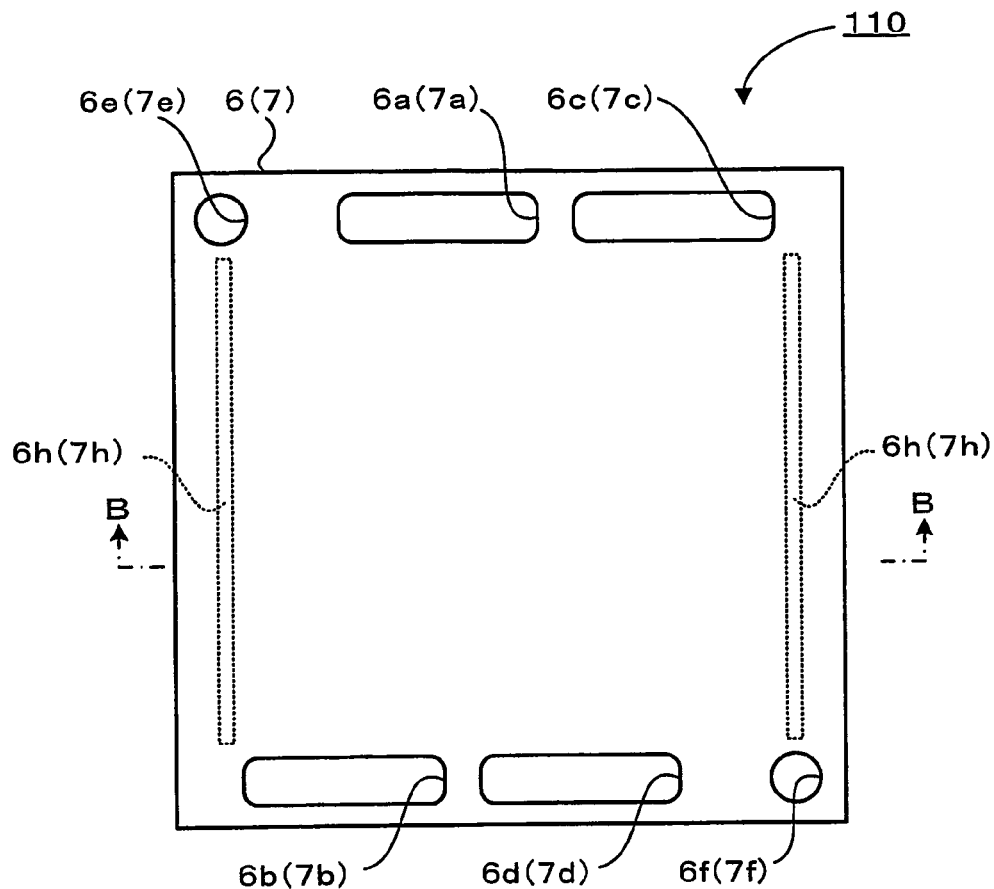
FIG. 25 shows one modified example of the fuel cell in the sixth embodiment.
Figure 26:
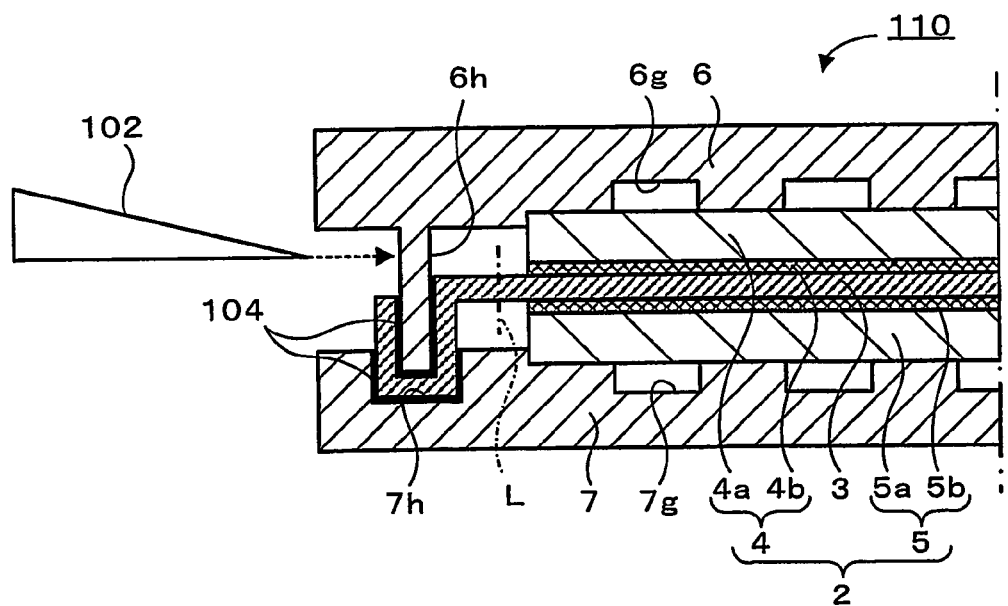
FIG. 26 is a sectional view of the fuel cell taken on B-B in FIG. 25.

The following describes three modified examples of the sixth embodiment. A fuel cell 110 shown in FIGS. 25 and 26 has similar structure to that of the fuel cell 50 of the sixth embodiment, except some differences given below. The fuel cell 110 has long projections 6h formed along two sides other than the sides with the inlets and outlets 6a to 6f on the inner face of the separator 6, and long grooves 7h formed at positions corresponding to the long projections 6h on the inner face of the separator 7 to mate with the long projections 6h. Sealing members 104 made of, for example, an adhesive or sealing tape, are applied on the long projections 6h and the long grooves 7h. The two ends of the electrolyte membrane 3 are interposed between the long projections 6h and the long grooves 7h. The like elements to those of the fuel cell 50 are expressed by the like numerals and symbols and are not specifically described here. The sealing members 8 are formed on the residual two sides of the separator 6 with the inlets and outlets 6a to 6f, as in the structure of the fuel cell 50. For disassembly of the fuel cell 110, the method first inserts the cutting blade 102 into the long projections 6h in the gap between the separators 6 and 7 to cut the long projections 6h off, as shown in FIG. 26. The method subsequently cuts off the sealing members 8 formed along the residual two sides of the separator 6 with the inlets and outlets 6a to 6f in the same manner as the method of the sixth embodiment. The method then removes the separator 6, cuts the electrolyte membrane 3 of the MEA 2 along a peripheral line L outside the electrodes 4 and 5, and collects the MEA 2 for recovery and recycle. This arrangement ensures effective disassembly of the fuel cell 110.

Figure 27:
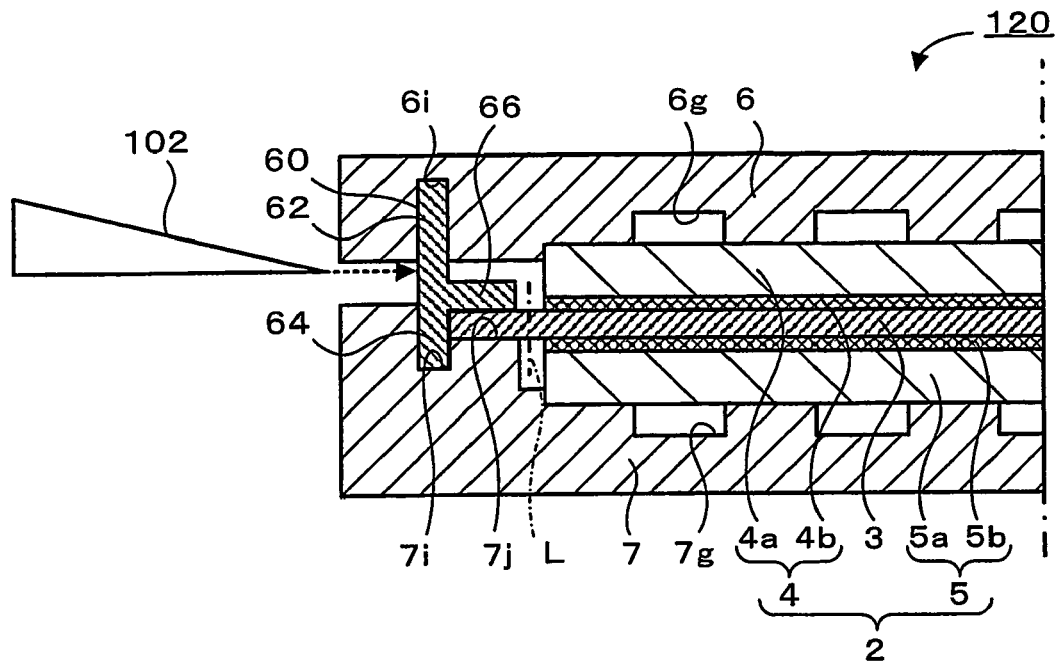
FIGS. 27 and 28 show a modified example of the fuel cell in the sixth embodiment.

A fuel cell 120 shown in FIG. 27 has first gasket insertion grooves 6i and second gasket insertion grooves 7i, in place of the long projections 6h and the long grooves 7h of the fuel cell 110 shown in FIG. 26, and uses gaskets 60 having a quasi-T-shaped cross section oriented at 90 degrees counterclockwise. Each of the gaskets 60 is made of an epoxy resin and has a first projection piece 62 with an adhesive to be inserted into the first gasket insertion groove 6i, a second projection piece 64 with an adhesive to be inserted into the second gasket insertion groove 7i, and a horizontal piece 66 to work with a step element 7j formed on the separator 7 and hold the end of the electrolyte membrane 3 therebetween. The gaskets 60 seal the space for the fuel gas defined by the electrolyte membrane 3 and the separator 6, while sealing the space for the oxidizing gas defined by the electrolyte membrane 3 and the separator 7, like the sealing members 8. For disassembly of this fuel cell 120, the method first inserts the cutting blade 102 into the first projection pieces 62 of the gaskets 60 in the gap between the separators 6 and 7 to cut the first projection pieces 62 off. The method subsequently cuts off the sealing members 8 formed along the residual two sides of the separator 6 with the inlets and outlets 6a to 6f in the same manner as the method of the sixth embodiment. The method then removes the separator 6, cuts the electrolyte membrane 3 of the MEA 2 along a peripheral line L outside the electrodes 4 and 5, and collects the MEA 2 for recovery and recycle. This arrangement ensures effective disassembly of the fuel cell 120.

Figure 28:
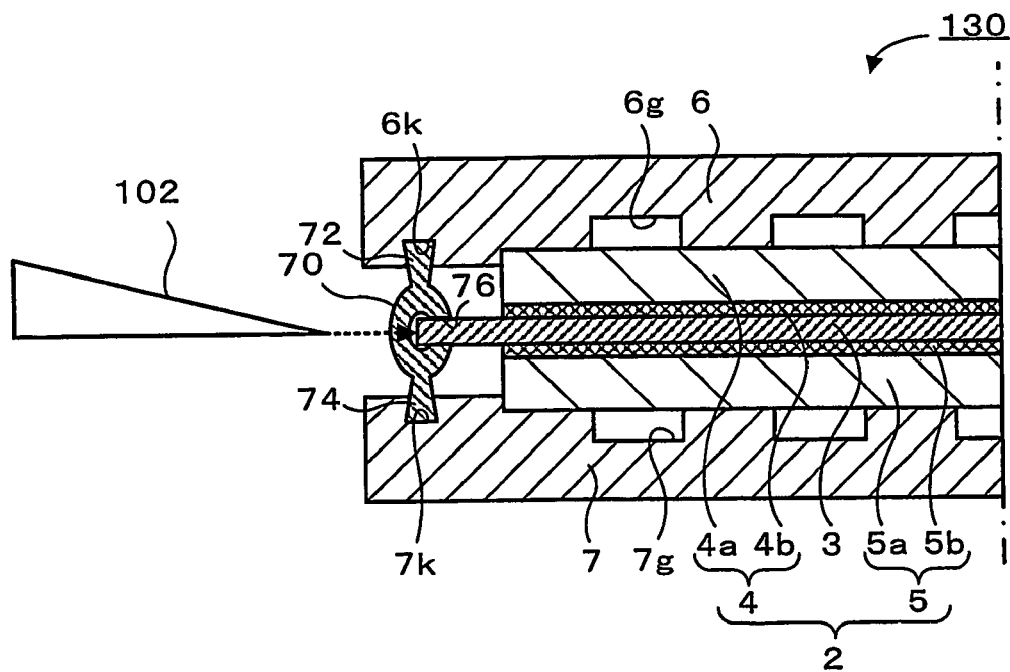

A fuel cell 130 shown in FIG. 28 has first gasket insertion grooves 6k and second gasket insertion grooves 7k, in place of the long projections 6h and the long grooves 7h of the fuel cell 110 shown in FIG. 26, and uses gaskets 70 having a quasi-C-shaped cross section. Both the gasket insertion grooves 6k and 7k have trapezoidal cross sections with narrowed openings. Each of the gaskets 70 is made of an epoxy rein and has a first projection piece 72 to be inserted into the first gasket insertion groove 6k, a second projection piece 74 to be inserted into the second gasket insertion groove 7k and an opening 76 to receive the end of the electrolyte membrane 3. The first and the second projection pieces 72 and 74 of the gasket 70 once inserted in the gasket insertion grooves 6k and 7k are not readily detachable. An adhesive may thus be applied or not be applied on the gasket insertion grooves 6k and 7k. The gaskets 70 seal the space for the fuel gas defined by the electrolyte membrane 3 and the separator 6, while sealing the space for the oxidizing gas defined by the electrolyte membrane 3 and the separator 7, like the sealing members 8. For disassembly of this fuel cell 130, the method first inserts the cutting blade 102 into the gaskets 70 in the gap between the separators 6 and 7 to cut the gaskets 70 off. The method subsequently cuts off the sealing members 8 formed along the residual two sides of the separator 6 with the inlets and outlets 6a to 6f in the same manner as the method of the sixth embodiment. The method then removes the separator 6, cuts the electrolyte membrane 3 of the MEA 2 along a peripheral line L outside the electrodes 4 and 5, and collects the MEA 2 for recovery and recycle. This arrangement ensures effective disassembly of the fuel cell 130.

Seventh Embodiment

Figure 29:
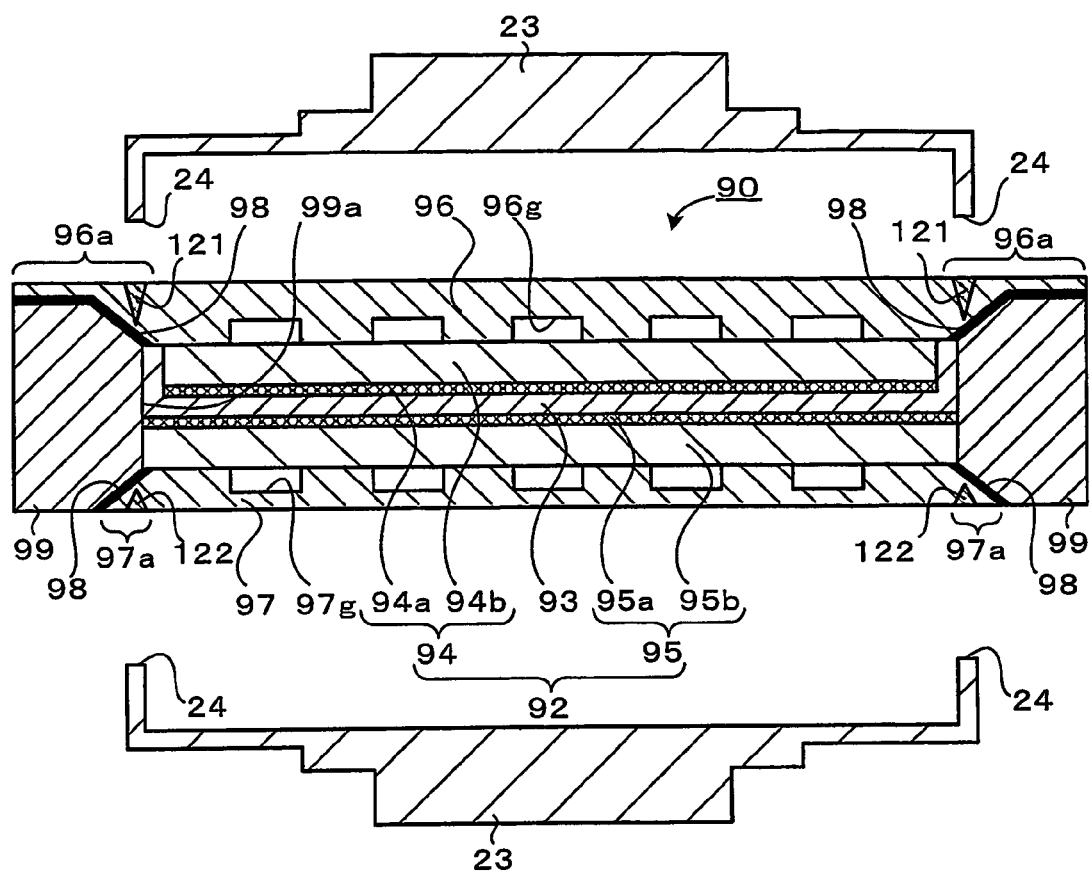
FIG. 29 is a sectional view schematically showing a disassembly method of a fuel cell in a seventh embodiment.
Figure 30:
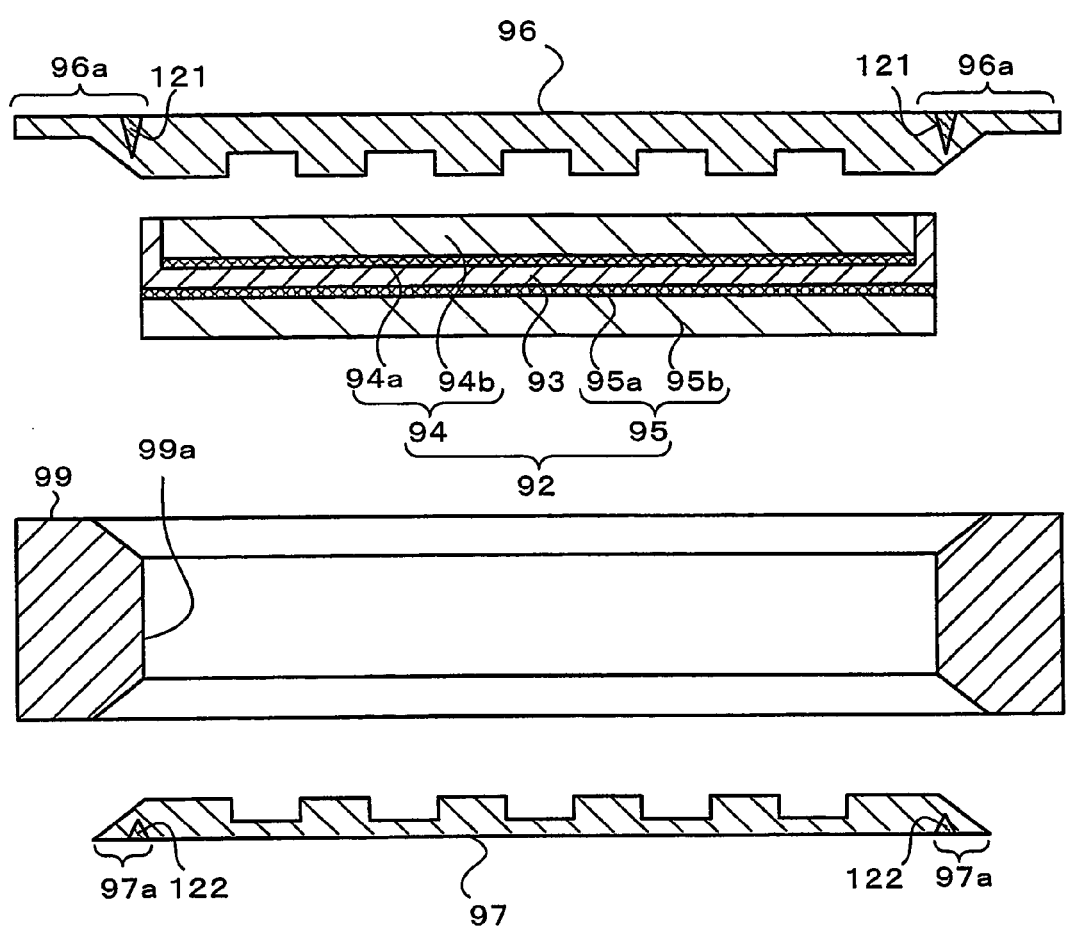
FIG. 30 is a sectional view showing the fuel cell before assembly.

A seventh embodiment of the invention is a modification of the second embodiment. FIG. 29 is a sectional view schematically illustrating the structure of a fuel cell 90 in the seventh embodiment of the invention. FIG. 30 is a sectional view showing the fuel cell 90 before assembly. The sectional view of FIG. 29 is taken like FIG. 1(*b*) as the A-A sectional view of FIG. 1(*a*).

The fuel cell 90 of this embodiment is a polymer electrolyte fuel cell and includes, as main constituents, an MEA 92 having an electrolyte membrane 93 interposed between a pair of electrodes 94 and 95, a dielectric outer frame member 99 to receive the MEA 92 in its inner-frame space 99a, a pair of dielectric separators 96 and 97 arranged across the MEA 92, sealing members 98 located to surround the outer circumference of the MEA 92 and bond the separators 96 and 97 to the outer frame member 99, and breaking guides 121 and 122 used for breakage of both the separators 96 and 97. A fuel gas conduit 96g for the flow of the fuel gas is formed on one face of the separator 96 that is in contact with the anode 94 of the MEA 92, and a coolant conduit (not shown) for the flow of the coolant is formed on the other face of the separator 96. An oxidizing gas conduit 97g for the flow of the oxidizing gas is formed on one face of the separator 97 that is in contact with the cathode 95 of the MEA 92, and a coolant conduit (not shown) for the flow of the coolant is formed on the other face of the separator 97.

The MEA 92 has the electrolyte membrane 93 located between the anode 94 and the cathode 95. The anodes 94 and the cathode 95 respectively have catalyst electrodes 94a and 95a and gas diffusion electrodes 94b and 95b. The electrolyte membrane 93 has a greater area than those of the anode 94 and the cathode 95 to have its periphery turned up and surround the side face of the anode 94. The outer frame member 99 is made of a dielectric material and has the inner-frame space 99a designed to have a substantially identical size with that of the MEA 92. The upper and the lower peripheries of the inner-frame space 99l are chamfered. The separator 97 is bonded to the bottom of the outer frame member 99 with an adhesive or sealing tape to form a container, and the MEA 92 is then received in the inner-frame space 99a of the container. This structure ensures accurate and easy positioning of the MEA 92 relative to the separator 97. The separator 97 has a thin-wall section 97*a* formed on the circumference thereof to be gradually thinner toward the end. The thin-wall section 97*a* of the separator 97 is designed to be fit in the chamfered periphery of the outer frame member 99. The separator 96 also has a thin-wall section 96*a* formed on the circumference thereof to be gradually thinner toward the end and have an end of a substantially fixed thickness. After the MEA 92 is received in the container defined by the outer frame member 99 and the separator 97, the separator 96 is bonded as a cover to the open top of the container with an adhesive or sealing tape. The sealing members 98 of an adhesive or sealing tape interposed between the outer frame member 99 and the separator 96, the sealing members 98 of the adhesive or sealing tape interposed between the outer frame member 99 and the separator 97, and the turned-up portion of the electrolyte membrane 93 to surround the anode 94 function to separate the space for the fuel gas defined by the MEA 92 and the separator 96 air-tightly from the space for the oxidizing gas defined by the MEA 92 and the separator 97.

The breaking guides 121 and 122 are members of a higher hardness material formed in the thin-wall sections 96*a* and 97*a* on the other planes of the separators 96 and 97 opposite to the planes facing the MEA 92 to be continuous around the peripheries of the respective separators 96 and 97. The breaking guides 121 and 122 are formed to have wedge-like cross sections, more specifically, quasi-V-shaped cross sections, in depth of the separators 96 and 97. The higher hardness material has a higher hardness than that of the separators 96 and 97, which are made of gas-impermeable molded carbon obtained by compression of carbon, and is for example, a metal or artificial graphite fired at high temperature (for example, temperature of not less than 2500° C.). The breaking guides 121 and 122 have electrical conductivity equivalent to or higher than that of the separators 96 and 97. The breaking guides 121 and 122 are formed to make the surfaces of the respective separators 96 and 97 substantially flat and even. The breaking guides 121 and 122 may be embedded in the separators 96 and 97. Otherwise specific portions of the separators 96 and 97 corresponding to the breaking guides 121 and 122 may be physically or chemically processed or treated (for example, heat treatment or chemical treatment) to be modified and have a higher hardness.

A disassembly procedure of disassembling the fuel cell 90 is described below. The procedure first places the two dumbbell-like cracking tools 23, 23 (see FIG. 11) to face the separators 96 and 97. More specifically, one of the cracking tools 23 facing the separator 96 is set to position its pressing member 24 opposite to the breaking guide 121, whereas the other of the cracking tools 23 facing the separator 97 is set to position its pressing member 24 opposite to the breaking guide 122. The procedure then shifts the two cracking tools 23, 23 to approach to each other and causes the pressing members 24, 24 of the cracking tools 23, 23 to apply force to the corresponding breaking guides 121 and 122. The breaking guide 121 formed on the separator 96 has the higher hardness than the separator 96 and is pressed by the cracking tool 23 to deeply go into the depth of the separator 96, whereas the breaking guide 122 formed on the separator 97 has the higher hardness than the separator 97 and is pressed by the cracking tool 23 to deeply go into the depth of the separator 97. The separators 96 and 97 are accordingly broken at their thin wall sections 96*a* and 97*a*, and the sealing members 98 are cut off simultaneously. The procedure then removes the broken separators 96 and 97 to expose the MEA 92 for recovery and recycle.

As described above, in the structure of the fuel cell 90 of the seventh embodiment, when disassembly of the fuel cell 90 is demanded, the heterogeneous properties of the breaking guides 121 and 122 are utilized to break the separators 96 and 97. This arrangement ensures easy disassembly of the fuel cell 90 when required. The separators 96 and 97 are broken at the respective positions outside the electrodes 94 and 95. The electrodes 94 and 95 of the MEA 92 are thus recoverable and recyclable, while being hardly damaged. The breaking guides 121 and 122 are formed in the thin-wall sections 96*a* and 97*a* on the other planes of the separators 96 and 97 opposite to the planes facing the MEA 92. This arrangement ensures easy access to the breaking guides 121 and 122 and facilitates formation of the breaking guides 121 and 122 in the thin-wall sections 96*a* and 97*a* on the opposite planes of the separators 96 and 97. The breaking guides 121 and 122 are formed to make the surfaces of the separators 96 and 97 substantially flat and even. Compared with the structure of the first embodiment with the concave breaking guides, this flat and even structure advantageously has the higher strength. The breaking guides 121 and 122 formed to have the wedge-like cross sections readily go into the depths of the separators 96 and 97 and are cracked when being pressed by the corresponding cracking tools 23, 23. The breaking guides 121 and 122 are made of the higher hardness material having the higher hardness than that of the separators 96 and 97 and are formed in the thin-wall sections 96*a* and 97*b* having the less thickness, compared with the structure of the second embodiment. The separators 96 and 97 are thus easily broken when the breaking guides 121 and 122 are pressed in the depths of the respective separators 96 and 97 by the corresponding cracking tools 23, 23. The breaking guides 121 and 122 have substantially equivalent electrical conductivity to that of the separators 96 and 97. In a fuel cell stack having multiple fuel cells 90 laid one upon another, this arrangement ensures a sufficiently large contact area of the adjoining fuel cells and a sufficiently high electrical conductivity.

In the structure of the seventh embodiment discussed above, the breaking guides 121 and 122 are formed in both the thin-wall sections 96*a* and 97*a* of the separators 96 and 97. The breaking guide may alternatively be formed in only one of the thin-wall sections of the separators. Multiple breaking guides may be formed in one of the thin-wall sections of the separators. The above description regards the disassembly procedure of one fuel cell 90. Multiple fuel cells 90 may be disassembled simultaneously, as in the modified procedure of FIG. 9. In the structure of the seventh embodiment discussed above, the breaking guides 121 and 122 are formed continuously in the thin-wall sections 96*a* and 97*a* around the peripheries of the respective separators 96 and 97. These breaking guides may alternatively be formed intermittently. For example, breaking guides 121 having multiple circular exposure areas on the separator 96 may be dotted around the periphery of the separator 96 (see FIG. 12). The exposure areas of the breaking guides 121 are not restricted to the circular shape but may be a polygonal shape (for example, a hexagonal shape) with an angle of two facing vertexes of the polygon set to be less than 90 degrees (for example 40 to 60 degrees) (see FIG. 4). When an external force is applied onto the breaking guides 121 by the pressing members 24 of the cracking tool 23, cracks readily start from the sharp vertexes and are extended in the direction of the face of the separator 96. This facilitates disassembly of the fuel cell 90. In this modified structure, the breaking guides 121 may be arranged at intervals that enable linkage of the cracks on the separator 96 in the direction of its face for breakage. The breaking guides 121 may have long exposure areas. The description above is also applicable to breaking guides 122.

Figure 31:
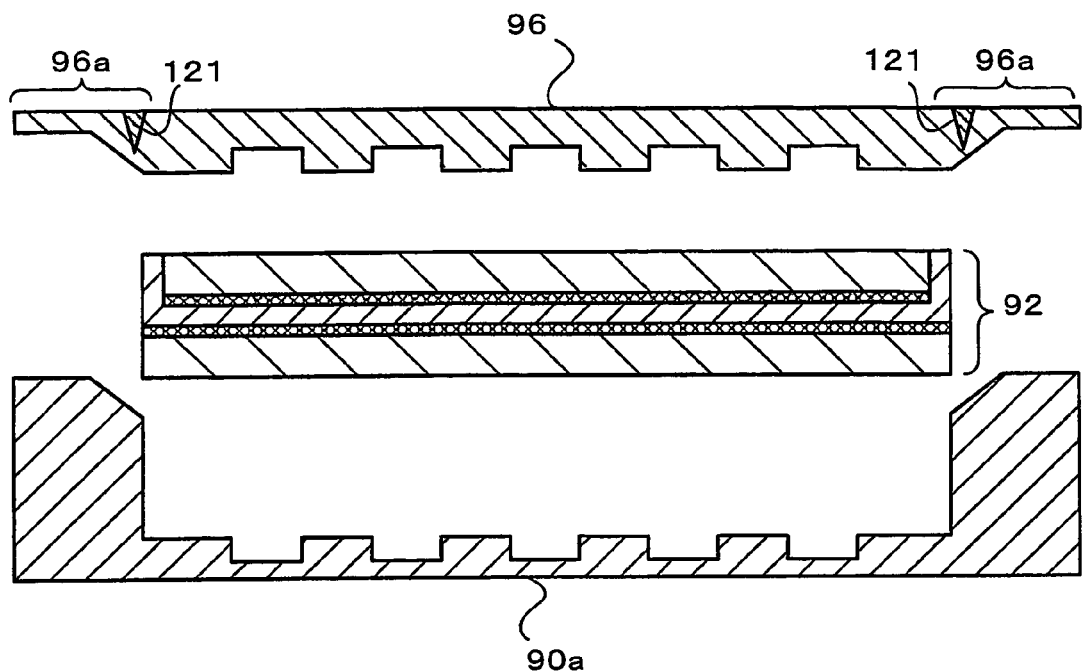
FIG. 31 shows the structure of one modified example of the fuel cell in the seventh embodiment.

In the structure of the seventh embodiment discussed above, the breaking guides 121 and 122 are made of the higher hardness material having the higher hardness than that of the separators 96 and 97. The breaking guides may alternatively be made of a lower hardness material having a lower hardness than that of the separators 96 and 97. For disassembly of the fuel cell of this modified structure, the cracking tools 27, 27 with the pressing members 28 shown in FIG. 13 are used to press the breaking guides into the depths of the separators 96 and 97. In the structure of the seventh embodiment, the container is formed by bonding the separator 97 to the outer frame member 99. An integral container 90a shown in FIG. 31 may replace the combination of the outer frame member 99 and the separator 97.

[Modifications]

Figure 32:
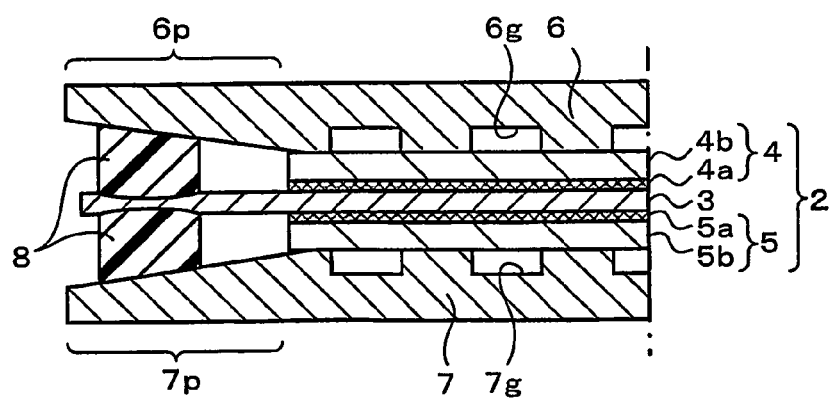
FIGS. 32 through 34 respectively show a sectional view of a fuel cell having a thin-wall sections.
Figure 33:
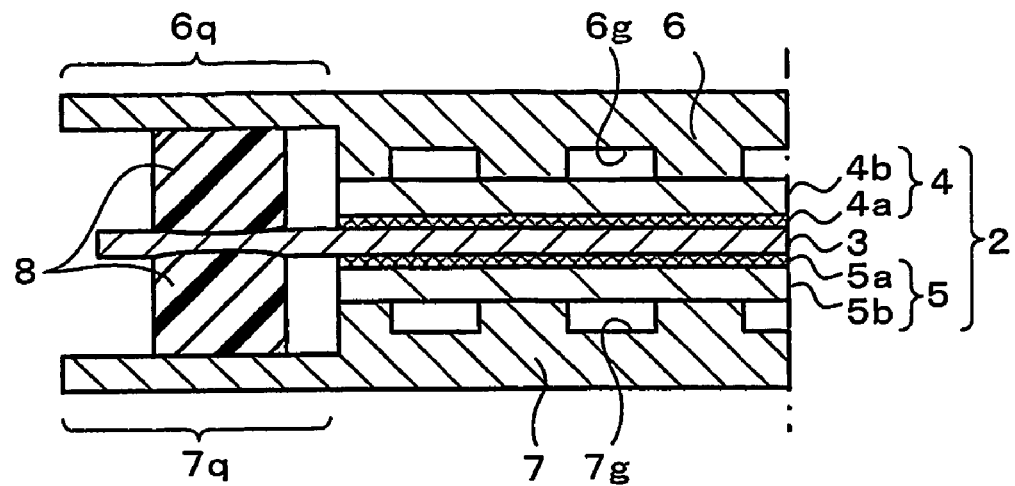
Figure 34:
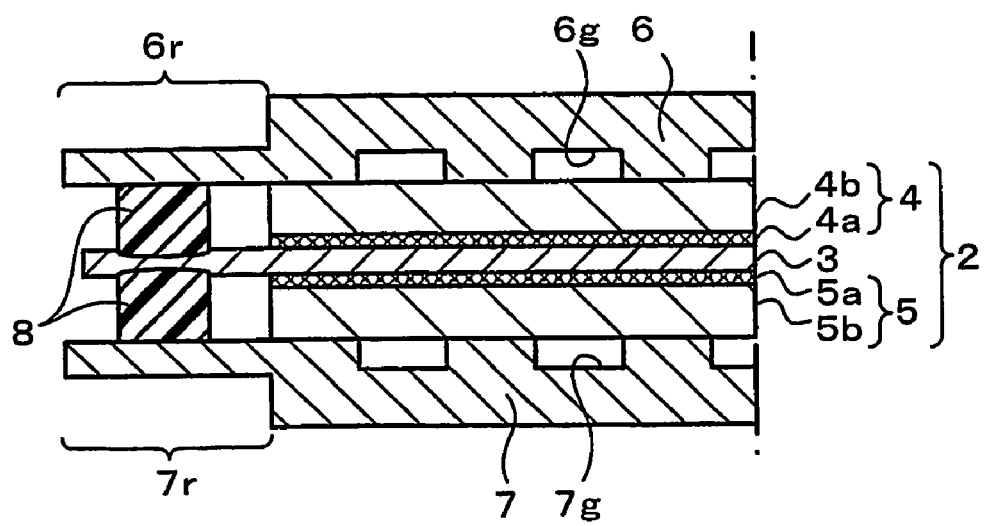

One possible modification may have thin-wall sections of a less thickness on the peripheries of the separators 6 and 7 and form the recesses 11, 13, 15, 17, and 18 as the breaking guides in the first embodiment and its modified example or the breaking guides 21, 22, 25, and 26 in the second embodiment and its modified examples in the thin-wall sections of the separators 6 and 7. The breaking guides 31, 37, and 38 in the third embodiment and its modified examples may be formed between the thin-wall section of the separator 6 and the thin-wall section of the separator 7. This modified arrangement further facilitates breakage of the separators 6 and 7. For example, the planes of the separators 6 and 7 facing the MEA 2 may be sloped to have thin-wall sections 6p and 7p having the gradually decreasing thickness toward the end, as shown in FIG. 32. In another example, the planes of the separators 6 and 7 facing the MEA 2 may be stepped from the outer-most part of the fuel gas conduit 6g and the oxidizing gas conduit 7g (thicker-wall sections) to have thin-wall sections 6q and 7q, as shown in FIG. 33. In still another example, the opposite planes of the separators 6 and 7 to the planes facing the MEA 2 may be stepped to have thin-wall sections 6r and 7r, as shown in FIG. 34. In order to keep the wide contact area of the adjoining separators in a stack of multiple fuel cells, the structure of the thin-wall sections 6p and 7p shown in FIG. 32 or the structure of the thin-wall sections 6q and 7q shown in FIG. 33 is preferable. The thin-wall section may be formed in only one of the separators 6 and 7. In the structure of FIG. 32, any of the recesses 11, 13, 15, 17, and 18 and the breaking guides 21, 22, 31, 37, and 38 may be omitted, and the thin-wall sections 6p and 7p may be used as the breaking guides. In this modified structure, an external force is applied in both upward and downward directions to compress the thin-wall sections 6p and 7p for breakage of the thin-wall sections 6p and 7p. Such an external force is also applied to the thin-wall sections 6q and 7q shown in FIG. 33 and to the thin-wall sections 6r and 7r shown in FIG. 34 for the same purpose.

The embodiments and the modified examples discussed above regard the polymer electrolyte fuel cells. The technique of the invention is, however, not restricted to the polymer electrolyte fuel cells but is also applicable to other types of fuel cells, for example, solid oxide fuel cells, molten carbonate fuel cells, phosphoric acid fuel cells, and alkaline fuel cells. The material of the sealing members 8 and the gaskets 60 and 70 is not specifically restricted but may be any material that ensures sufficient sealing properties, for example, engineering plastics, epoxy resins, phenol resins, polyimide resins, fluorocarbon resins (PTFE and PFA), unsaturated polyester resins, and polypropylenes.

The embodiments and their modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The fuel cell of the invention is available as the power supply for automobiles, the power supply for domestic use, the power supply for business use, and the power supply for diverse electrical equipment.

The invention claimed is:

1. A fuel cell that generates electric power through reaction of a fuel gas with an oxidizing gas, said fuel cell comprising:
    an electrode assembly that has an electrolyte interposed between a pair of electrodes;
    a pair of separators that are arranged across the electrode assembly, where one of the separators facing one of the electrodes has an oxidizing gas conduit, while the other of the separators facing the other of the electrodes has a fuel gas conduit;
    a sealing member that is formed along periphery of the electrode assembly in a gap between the pair of separators; and
    a breaking guide that is used for breakage of at least one of the separators.

2. A fuel cell in accordance with claim 1, wherein the electrolyte is a solid electrolyte.

3. A fuel cell in accordance with claim 1, wherein the breaking guide is used to break at least one of the separators at a position outside the electrodes but inside the sealing member.

4. A fuel cell in accordance with claim 1, wherein the breaking guide is formed at or in a neighborhood of a position of the sealing member on at least one of the separators.

5. A fuel cell in accordance with claim 1, wherein the breaking guide is formed in a thin-wall section formed on at least one of the separators.

6. A fuel cell in accordance with claim 1, wherein the breaking guide is provided on at least one of the separators and is formed on a specific plane of the separator other than a plane facing the electrode assembly.

7. A fuel cell in accordance with claim 1, wherein the breaking guide is provided on at least one of the separators and is formed on a specific plane of the separator opposite to a plane facing the electrode assembly.

8. A fuel cell in accordance with claim 1, wherein the breaking guide includes a recess continuously formed around periphery of the separator.

9. A fuel cell in accordance with claim 8, wherein the recess has any of a wedge-shaped cross section, a quasi-V-shaped cross section, a quasi-U-shaped cross section, and a quasi-circular cross section in depth of the separator.

10. A fuel cell in accordance with claim 8, wherein the recess is also used as a coolant conduit disposed in the separator.

11. A fuel cell in accordance with claim 1, wherein the breaking guide includes multiple recesses intermittently arranged around periphery of the separator.

12. A fuel cell in accordance with claim 11, wherein each of the multiple recesses has a polygonal opening which has at least one vertex angle of less than 90 degrees.

13. A fuel cell in accordance with claim 11, wherein the recess has any of a wedge-shaped cross section, a quasi-V-shaped cross section, a quasi-U-shaped cross section, and a quasi-circular cross section in depth of the separator.

14. A fuel cell in accordance with claim 1, wherein the breaking guide is provided on at least one of the separators and is mainly made of a different material having a different physical or chemical property from a physical or chemical property of a material of the separator.

15. A fuel cell in accordance with claim 14, wherein the breaking guide is formed in the separators to make surface of the separator substantially flat and even.

16. A fuel cell in accordance with claim 14, wherein the breaking guide is formed continuously formed around periphery of the separator.

17. A fuel cell in accordance with claim 14, wherein the breaking guide is formed intermittently arranged around periphery of the separator.

18. A fuel cell in accordance with claim 17, wherein the breaking guide has a polygonal exposure area with at least one vertex angle of less than 90 degrees, on surface of the separator.

19. A fuel cell in accordance with claim 14, wherein the breaking guide has a wedge-shaped cross section in depth of the separator.

20. A fuel cell in accordance with claim 14, wherein the different material has a practically equivalent electrical conductivity to an electrical conductivity of the separator.

21. A fuel cell in accordance with claim 14, wherein the different material has a different hardness from a hardness of the separator.

22. A fuel cell in accordance with claim 21, wherein the different material has a higher hardness than the hardness of the separator.

23. A fuel cell in accordance with claim 21, wherein the different material has a lower hardness than the hardness of the separator.

24. A fuel cell in accordance with claim 1, wherein the breaking guide comprises a blockage member that is formed on or outside the periphery of the electrode assembly in the gap between the pair of separators to prevent the gap from being narrowed less than a preset width under application of a pressing force in a direction of narrowing the gap.

25. A fuel cell in accordance with claim 24, wherein the blockage member is arranged along periphery of the separator not to interfere with smooth supply and discharge of the fuel gas and the oxidizing gas.

26. A fuel cell in accordance with claim 24, wherein the blockage member is made of a dielectric material.

27. A fuel cell in accordance with claim 24, wherein top and bottom portions of the blockage member come into close contact with the pair of separators to prevent leakage of the sealing member, when the blockage member is pressed toward an end of the separator.

28. A fuel cell in accordance with claim 24, wherein the blockage member has a quasi-circular cross section in depth of the separator, and each of the separators has a gradual-varying portion to gradually narrow the gap between the pair of separators toward ends of the separators.

29. A fuel cell in accordance with claim 28, wherein the blockage member includes either round bar members or spherical members arranged along periphery of the separator.

30. A fuel cell in accordance with claim 1, wherein the breaking guide includes an inclined face that is formed on at least one of the separators and is extended from an outer end position of the sealing member or its nearby position toward an end of the separator to gradually widen the gap between the pair of separators.

31. A fuel cell in accordance with claim 30, wherein the inclined face keeps a space for inserting a cracking tool having a sloped edge into the gap between the pair of separators.

32. A fuel cell in accordance with claim 31, wherein the inclined face has an angle of inclination that is not less than an angle of gradient of the sloped edge of the cracking tool.

33. A fuel cell in accordance with claim 30, wherein the breaking guide includes the inclined face and a horizontal face that is formed on the other of the separators to guide a horizontal movement of an edge of a cracking tool inserted inward into the gap between the pair of separators.

34. A fuel cell in accordance with claim 1, wherein the breaking guide includes a thin-wall section formed on at least one of the separators.

35. A fuel cell in accordance with claim 34, wherein the thin-wall section is formed by cutting down a plane of the separator facing the electrode assembly.

36. A disassembly method of disassembling a fuel cell, which comprises: an electrode assembly that has an electrolyte interposed between a pair of electrodes; a pair of separators that are arranged across the electrode assembly, where one of the separators facing one of the electrodes has an oxidizing gas conduit, while the other of the separators facing the other of the electrodes has a fuel gas conduit; a sealing member that is formed along periphery of the electrode assembly in a gap between the pair of separators; and a breaking guide that is used for breakage of at least one of the separators,
said disassembly method comprising the step of:
utilizing the breaking guide to apply an external force from outside of said fuel cell to an outer face of at least one of the separators or the gap between the pair of separators, so as to facilitate disassembly of said fuel cell.

37. A disassembly method in accordance with claim 36, wherein said disassembly-facilitating step applies the external force to a position outside the electrodes but inside the sealing member on at least one of the separators.

38. A disassembly method in accordance with claim 36, wherein the breaking guide comprises either one recess formed continuously along periphery of the separator or multiple recesses formed intermittently along the periphery of the separator, and
said disassembly-facilitating step uses a cracking tool to apply the external force to the breaking guide and thereby break at least one of the separators.

39. A disassembly method in accordance with claim 38, wherein said disassembly-facilitating step places an edge of the cracking tool on a bottom of the recess and applies the external force to the bottom, so as to break at least one of the separators.

40. A disassembly method in accordance with claim 38, wherein said disassembly-facilitating step sets a bottom of the recess where an edge of the cracking tool is placed, as a point of application, an opening edge of the recess where a flat side of the cracking tool is placed, as a point of support, and a base end of the cracking tool where a force is applied, as a point of power, and applies the external force to the point of application by principle of leverage, so as to break at least one of the separators.

41. A disassembly method in accordance with claim 38, wherein said disassembly-facilitating step provides the cracking tool having a sloped edge and inserts the sloped edge of the cracking tool into an opening of the recess to apply the external force in an expanding direction to the recess, so as to break at least one of the separators.

42. A disassembly method in accordance with claim 36, wherein the breaking guide is provided on at least one of the separators and is mainly made of a different material having a different physical or chemical property from a physical or chemical property of a material of the separator.

43. A disassembly method in accordance with claim 42, wherein said disassembly-facilitating step uses a cracking tool to apply the external force to the breaking guide and thereby break at least one of the separators.

44. A disassembly method in accordance with claim 42, wherein the different material is a material of a higher hardness than a hardness of the separator, and
said disassembly-facilitating step uses a cracking tool to apply the external force to the breaking guide and thereby press the breaking guide into depth of the separator for breakage of the separator.

45. A disassembly method in accordance with claim 42, wherein the different material is a material of a lower hardness than a hardness of the separator, and
said disassembly-facilitating step places an edge of a cracking tool on the breaking guide and applies the external force to the breaking guide to press the edge of the cracking tool into depth of the separator and destroy the breaking guide for breakage of the separator.

46. A disassembly method in accordance with claim 36, wherein the breaking guide comprises a blockage member that is formed on or outside the periphery of the electrode assembly in the gap between the pair of separators to prevent the gap from being narrowed less than a preset width under application of a pressing force in a direction of narrowing the gap, and
said disassembly-facilitating step applies the external force to an inward area of the separator inside the blockage member in a direction of narrowing the gap, so as to break at least one of the separators.

47. A disassembly method in accordance with claim 36, wherein the breaking guide includes an inclined face that is formed on at least one of the separators and is extended from an outer end position of the sealing member or its nearby position toward an end of the separator to gradually widen the gap between the pair of separators, and
said disassembly-facilitating step applies the external force to an inward area of the separator inside the sealing member in a direction of narrowing the gap between the pair of separators and inserting an edge of a cracking tool along the breaking guide into depth of the gap, so as to break at least one of the separators.

48. A disassembly method in accordance with claim 47, wherein said disassembly-facilitating step provides two cracking tools and inserts the two cracking tools from opposite directions into the gap between the pair of separators.

49. A disassembly method in accordance with claim 47, wherein said disassembly-facilitating step inserts the edge of the cracking tool along the breaking guide into the gap between the pair of separators and twists the cracking tool, so as to break at least one of the separators.

50. A disassembly method in accordance with claim 36, wherein the breaking guide includes a thin-wall section formed on at least one of the separators, and
said disassembly-facilitating step applies the external force from outside of said fuel cell to an outer face of the thin-wall section of the breaking guide or a space defined by the thin-wall section.

51. A disassembly method of disassembling a fuel cell, which comprises: an electrode assembly that has an electrolyte interposed between a pair of electrodes; a pair of separators that are arranged across the electrode assembly, where one of the separators facing one of the electrodes has an oxidizing gas conduit, while the other of the separators facing the other of the electrodes has a fuel gas conduit; and a sealing member that is formed along periphery of the electrode assembly in a gap between the pair of separators,
said disassembly method comprising the step of:
applying an external force from outside of said fuel cell to an outer face of at least one of the separators or the gap between the pair of separators, so as to facilitate disassembly of said fuel cell,
wherein said disassembly-facilitating step inserts a cutting tool from outside of said fuel cell into the gap between the pair of separators, so as to apply the external force.

52. A disassembly method of disassembling a fuel cell, which comprises: an electrode assembly that has an electrolyte interposed between a pair of electrodes: a pair of separators that are arranged across the electrode assembly, where one of the separators facing one of the electrodes has an oxidizing gas conduit, while the other of the separators facing the other of the electrodes has a fuel gas conduit; and a sealing member that is formed along periphery of the electrode assembly in a gap between the pair of separators,
said disassembly method comprising the step of:
applying an external force from outside of said fuel cell to an outer face of at least one of the separators or the gap between the pair of separators, so as to facilitate disassembly of said fuel cell,
wherein said disassembly-facilitating step cuts the sealing member arranged in the gap between the pair of separators with a cutting tool.

53. A disassembly method of disassembling a fuel cell, which comprises: an electrode assembly that has an electrolyte interposed between a pair of electrodes; a pair of separators that are arranged across the electrode assembly, where one of the separators facing one of the electrodes has an oxidizing gas conduit, while the other of the separators facing the other of the electrodes has a fuel gas conduit; and a sealing member that is formed along periphery of the electrode assembly in a gap between the pair of separators,
said disassembly method comprising the step of:
applying an external force from outside of said fuel cell to an outer face of at least one of the separators or the gap between the pair of separators, so as to facilitate disassembly of said fuel cell,
wherein said disassembly-facilitating step clamps the pair of separators to apply a pressure and successively shifts a pressing position to give warpage of the separators in directions away from each other.

54. A disassembly method in accordance with claim 53, wherein the pair of separators are made of a metal.

55. A disassembly method in accordance with claim 53, wherein said disassembly-facilitating step heats the sealing member to soften or melt the sealing member, simultaneously with clamping the pair of separators to apply the pressure, and successively shifts a heating and pressing position along a line of the sealing member.

56. A disassembly method in accordance with claim 53, wherein said disassembly-facilitating step uses a pair of pressure rollers to clamp the pair of separators for application of the pressure and to successively shift the pressing position.

57. A disassembly method in accordance with claim 53, wherein said disassembly-facilitating step uses a pair of rollers with a heater function to heat the sealing member and thereby soften or melt the sealing member, simultaneously with clamping the pair of separators for application of the pressure, and to successively shift a heating and pressing position along a line of the sealing member.

58. A separator, which is used in a pair to be arranged across an electrode assembly having an electrolyte interposed between a pair of electrodes, said separator comprising a breaking guide that is formed along periphery of said separator for breakage of said separator.

59. A separator in accordance with claim 58, wherein the electrolyte is a solid electrolyte.

60. A separator in accordance with claim 58, wherein the breaking guide is used to break said separator at a position outside the electrodes but inside a sealing member, which is arranged along periphery of the electrode assembly.

61. A separator in accordance with claim 58, wherein the breaking guide is formed at or in a neighborhood of a position of a sealing member, which is arranged along periphery of the electrode assembly.

62. A separator in accordance with claim 58, wherein the breaking guide is formed in a thin-wall section of said separator having a less thickness than a thickness of the other part of said separator.

63. A separator in accordance with claim 58, wherein the breaking guide is provided on at least one of the separators and is formed on a specific plane of the separator other than a plane facing the electrode assembly.

64. A separator in accordance with claim 58, wherein the breaking guide is provided on at least one of the separators and is formed on a specific plane of the separator opposite to a plane facing the electrode assembly.

65. A separator in accordance with claim 58, wherein the breaking guide includes a recess continuously formed around periphery of the separator.

66. A separator in accordance with claim 65, wherein the recess has any of a wedge-like cross section, a quasi-V-shaped cross section, a quasi-U-shaped cross section, and a quasi-circular cross section in depth of the separator.

67. A separator in accordance with claim 65, wherein the recess is also used as a coolant conduit used for cooling down a fuel cell in which said separator is included.

68. A separator in accordance with claim 50, wherein the breaking guide includes multiple recesses intermittently arranged around periphery of the separator.

69. A separator in accordance with claim 68, wherein each of the multiple recesses has a polygonal opening which has at least one vertex angle of less than 90 degrees.

70. A separator in accordance with claim 68, wherein the recess has any of a wedge-like cross section, a quasi-V-shaped cross section, a quasi-U-shaped cross section, and a quasi-circular cross section in depth of the separator.

71. A separator in accordance with claim 58, wherein the breaking guide is mainly made of a different material having a different physical or chemical property from a physical or chemical property of a material of said separator.

72. A separator in accordance with claim 71, wherein the breaking guide is formed to make surface of said separator substantially flat and even.

73. A separator in accordance with claim 71, wherein the breaking guide comprises an element formed continuously along the periphery of said separator.

74. A separator in accordance with claim 73, wherein the breaking guide has a wedge-like cross section in depth of the separator.

75. A separator in accordance with claim 73, wherein the different material has a practically equivalent electrical conductivity to an electrical conductivity of the separator.

76. A separator in accordance with claim 73, wherein the different material has a different hardness from a hardness of the separator.

77. A separator in accordance with claim 76, wherein the different material has a higher hardness than the hardness of the separator.

78. A separator in accordance with claim 76, wherein the different material has a lower hardness than the hardness of the separator.

79. A separator in accordance with claim 71, wherein the breaking guide comprises multiple elements formed intermittently along the periphery of said separator.

80. A separator in accordance with claim 79, wherein the breaking guide has a polygonal exposure area with at least one vertex angle of less than 90 degrees, on surface of the separator.

81. A separator in accordance with claim 58, wherein the breaking guide includes an inclined face that is extended from an outer end position of a sealing member, which is arranged along periphery of the electrode assembly, or its nearby position toward an end of said separator.

82. A separator in accordance with claim 81, wherein the inclined face makes a space for insertion of a cracking tool having a sloped edge from the end of said separator toward the sealing member, which is arranged along the periphery of the electrode assembly.

83. A separator in accordance with claim 82, wherein the inclined face has an angle of inclination that is not less than an angle of gradient of the sloped edge of the cracking tool.

84. A separator in accordance with claim 58, wherein the breaking guide includes a thin-wall section having a less thickness than a thickness of the other part of said separator.

85. A separator in accordance with claim 84, wherein the thin-wall section is formed by cutting down a plane of said separator facing the electrode assembly.

\* \* \* \* \*